United States Patent [19]
Yatake

[11] Patent Number: 6,004,389
[45] Date of Patent: Dec. 21, 1999

[54] PIGMENT INK COMPOSITION CAPABLE OF FORMING IMAGE HAVING NO SIGNIFICANT BLEEDING OR FEATHERING

[75] Inventor: Masahiro Yatake, Suwa, Japan

[73] Assignee: Seiko Epson Corporation, Tokyo, Japan

[21] Appl. No.: 09/008,472

[22] Filed: Jan. 16, 1998

Related U.S. Application Data

[62] Division of application No. 08/705,287, Aug. 29, 1996, Pat. No. 5,746,818.

[30] Foreign Application Priority Data

| Aug. 31, 1995 | [JP] | Japan | 7-224330 |
| Oct. 6, 1995 | [JP] | Japan | 7-260585 |
| Jan. 19, 1996 | [JP] | Japan | 8-7216 |
| Apr. 16, 1996 | [JP] | Japan | 8-94568 |
| Aug. 1, 1996 | [JP] | Japan | 8-204008 |

[51] Int. Cl.$^6$ ................................ C09D 11/02
[52] U.S. Cl. .................... 106/31.86; 106/31.28; 106/31.52; 106/31.89
[58] Field of Search ............ 106/31.86, 31.28, 106/31.52, 31.89

[56] References Cited

U.S. PATENT DOCUMENTS

| 4,597,794 | 7/1986 | Ohta et al. | 106/31.6 |
| 5,156,675 | 10/1992 | Breton et al. | 106/31.86 |
| 5,183,502 | 2/1993 | Meichsner et al. | 106/31.58 |
| 5,196,056 | 3/1993 | Prasad | 106/31.58 |
| 5,376,169 | 12/1994 | Hotomi et al. | 106/31.73 |
| 5,417,747 | 5/1995 | Arata et al. | 106/31.88 |
| 5,441,561 | 8/1995 | Chujo et al. | 106/31.58 |

FOREIGN PATENT DOCUMENTS

| 0441987 | 8/1991 | European Pat. Off. . |
| 0635380 | 1/1995 | European Pat. Off. . |

OTHER PUBLICATIONS

Patent Abstract of Japan of JP 6–128,517 dated May 1994.
Patent Abstract of Japan of JP 5–339,516 dated Dec. 1992.

*Primary Examiner*—Helene Klemanski
*Attorney, Agent, or Firm*—Ladas & Parry

[57] ABSTRACT

An ink for ink jet recording is provided which can form a record having a high color density, free from the occurrence of bleeding or feathering even on recycled paper, and possessing water resistance. An ink composition comprising a pigment dispersible and/or soluble in water without the aid of any dispersant and a glycol ether selected from the group consisting of diethylene glycol mono-n-butyl ether, triethylene glycol mono-n-butyl ether, propylene glycol mono-n-butyl ether, and dipropylene glycol mono-n-butyl ether can realize a print having no significant bleeding or feathering. Further, a high-quality image having much less bleeding or feathering can be realized by an ink jet recording method wherein a reaction solution, containing a reactant, capable of breaking the state of dispersion and/or dissolution of a pigment in the ink composition is brought into contact with the ink composition.

19 Claims, 3 Drawing Sheets

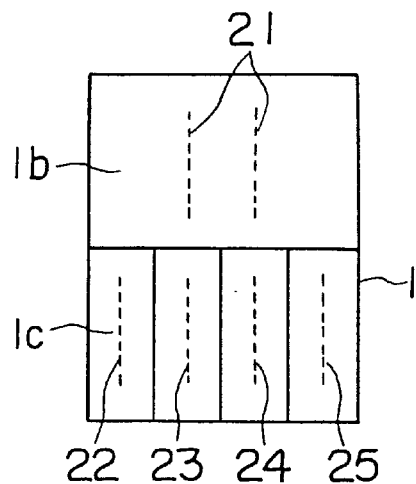
F I G. 2
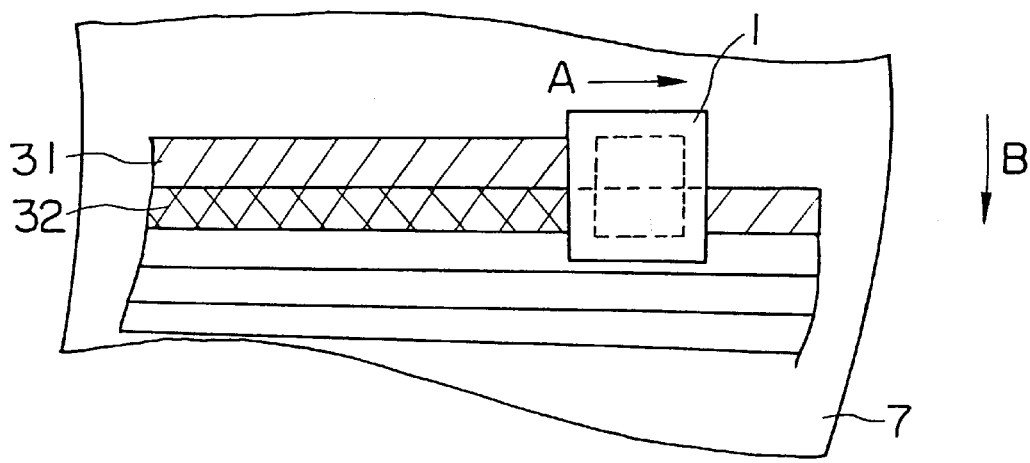
F I G. 3
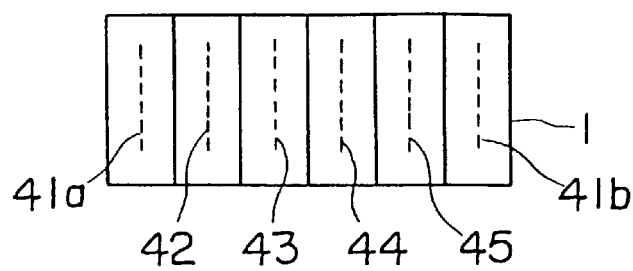
F I G. 4

PIGMENT INK COMPOSITION CAPABLE OF FORMING IMAGE HAVING NO SIGNIFICANT BLEEDING OR FEATHERING

This is a divisional of application Ser. No. 08/705,287 filed on Aug. 29, 1996, now U.S. Pat. No. 5,746,818, claims the benefit thereof and incorporates the same by reference.

BACKGROUND OF THE INVENTION

1. Field of the Invention

The present invention relates to an ink, for ink jet recording, which can form a high-quality print having no significant bleeding or feathering on plain paper, recycled paper, or coat paper.

2. Background Art

Ink jet recording is a recording method wherein an ink is ejected as small droplets through a fine nozzle and deposited onto the surface of a recording medium to record letters or figures on the recording medium. An ink used in such ink jet recording is required to have properties including the formation of a record having a good drying property and free from bleeding or feathering and uniform recording on the surface of recording media irrespective of the type of the recording media.

What is to be noted here as a problem associated with the above properties is that, when paper is used as the recording medium, a difference in penetration of an ink between fibers constituting the paper is likely to cause bleeding or feathering. The problem of bleeding or feathering is more significant on the recycled paper which, in recent years, has become extensively used from the viewpoint of environmental problems. This is because the recycled paper is an aggregate of various paper components different from one another in rate of ink penetration. The bleeding or feathering due to the difference in penetration rate.

Various ink compositions have hitherto been proposed in order to prevent bleeding or feathering.

For example, Japanese Patent Publication No 2907/1990 proposes the utilization of a glycol ether as a wetting agent, Japanese Patent Publication No. 15542/1989 proposes the utilization of a water-soluble organic solvent, and Japanese Patent Publication No. 3837/1990 proposes the utilization of a dye dissolution accelerator. U.S. Pat. No. 5,156,675 proposes the addition of diethylene glycol monobutyl ether in order to improve the penetration of the ink, U.S. Pat. No. 5,183,502 proposes the addition of Surfynol 465 as an acetylene glycol surfactant, and U.S. Pat. No. 5,196,056 proposes the addition of both diethylene glycol monobutyl ether and Surfynol 465. In this connection, it should be noted that diethylene glycol mono-n-butyl ether is known also as "butyl carbitol" and described in, for example, U.S. Pat. No. 3,291,580. Further, the use of diethylene glycol ether has been studied in U.S. Pat. No. 2,083,372. Further, Japanese Patent Laid-Open No. 147861/1981 proposes the combined use of a pigment and triethylene glycol monomethyl ether.

Furthermore, heating of recording paper has been studied for reducing the bleeding or feathering. Heating of recording paper at the time of recording poses problems including that much time is necessary in order to raise the temperature of a heating section in the recording apparatus to a predetermined temperature. Moreover, the power consumption of the body of the recording apparatus is increased. Sometimes, recording media, such as recording paper, are damaged by the heat.

In the case of inks using a pigment, methyl ethers as disclosed in Japanese Patent Laid-Open No. 147861/1981 are, in many cases, used as the glycol ethers for inhibiting the penetration of the ink.

However, a need still exits for an ink composition which can realize a high-quality image having no significant bleeding or feathering.

An ink composition comprising a combination of a pigment with a butyl ether of a glycol, such as diethylene glycol monobutyl ether, has not been proposed in the art, so far as the present inventors know.

SUMMARY OF THE INVENTION

We have now found that an ink composition comprising a pigment and a butyl ether of a specific glycol, such as diethylene glycol monobutyl ether can effectively inhibit the bleeding or feathering, realizing a high-quality image. Further, we have found that the use of the above ink composition in a recording method using the so-called "two liquids," wherein a reaction solution and an ink composition are deposited to conduct printing, can provide a better image.

Accordingly, an object of the present invention is to provide an ink composition which can realize a good image on plain paper and even on recycled paper.

Another object of the present invention is to provide a recording method which can realize a good image on plain paper and even on recycled paper.

According to one aspect of the present invention, there is provided an ink composition comprising at least a pigment, a glycol ether, and water, the pigment being dispersible and/or soluble in water without the aid of any dispersant, the glycol ether being one member or a mixture of at least two members selected from the group consisting of diethylene glycol mono-n-butyl ether, triethylene glycol mono-n-butyl ether, propylene glycol mono-n-butyl ether, and dipropylene glycol mono-n-butyl ether.

According to another aspect of the present invention, there is provided a recording method comprising the step of: depositing a reactant-containing reaction solution and an ink composition onto a recording medium to conduct printing, wherein an ink composition according to the present invention is used as the ink composition, and the reactant can break the state of dispersion and/or dissolution of the pigment.

BRIEF DESCRIPTION OF THE DRAWINGS

FIG. 2 is an enlarged view of a nozzle face in a recording head, wherein 1b designates a nozzle face for a reaction solution and c designates a nozzle face for an ink composition;

FIG. 3 is an explanatory view for ink jet recording using the recording head shown in FIG. 2, wherein numeral 31 designates a reaction solution deposited area and numeral 32 designates a printed area with an ink composition printed on the reaction solution deposited area;

FIG. 4 is a diagram showing another embodiment of a recording head according to the present invention, wherein all ejection nozzles are arranged in lateral direction.

DETAILED DESCRIPTIONS OF THE INVENTION

Ink composition

Figure 1:
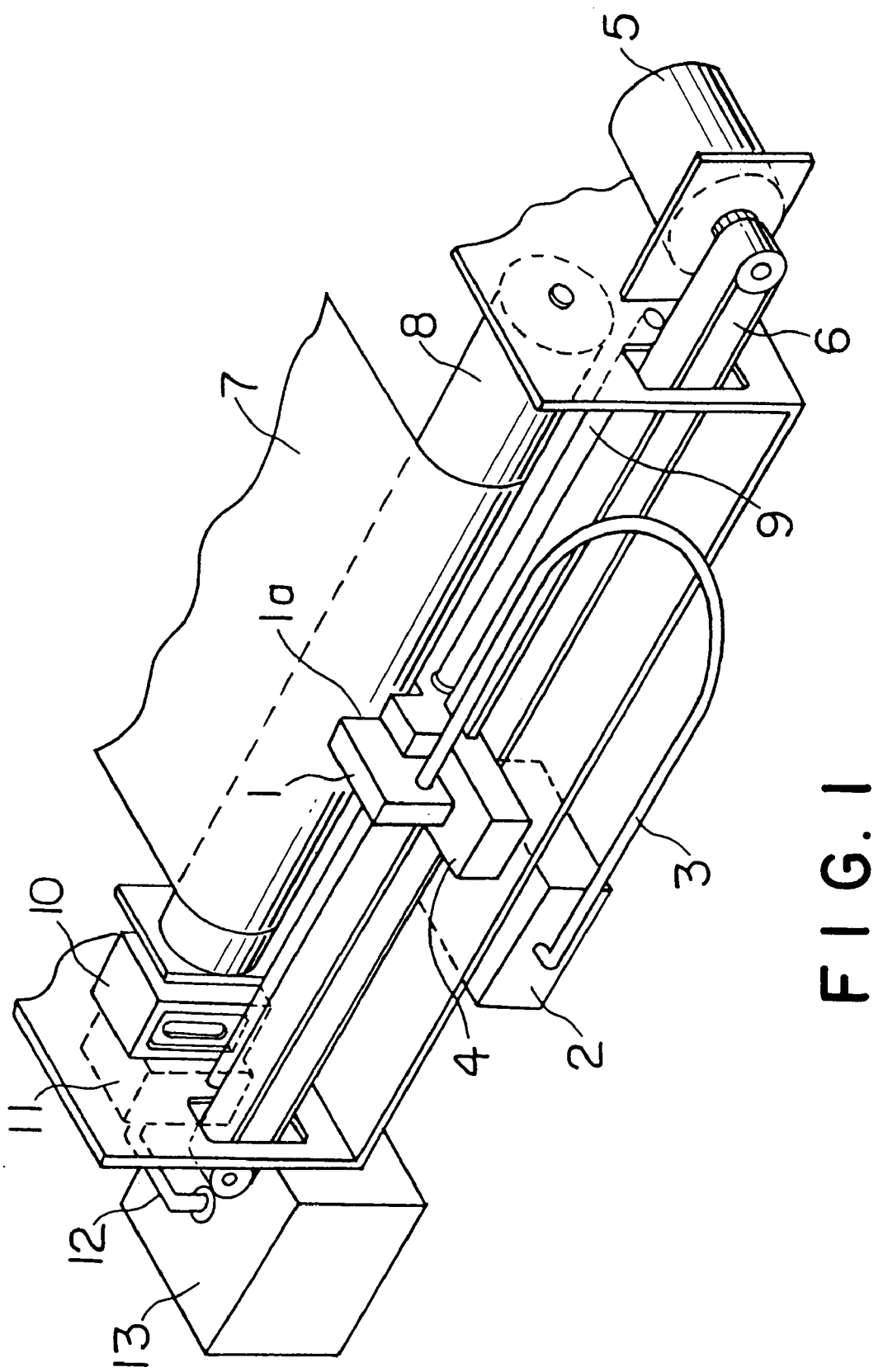
FIG. 1 is a diagram showing an ink jet recording apparatus according to the present invention, wherein a recording head is provided independently of an ink tank and an ink composition and a reaction solution are supplied into the recording head through an ink tube.

The ink composition according to the present invention is used in a recording system using an ink composition. The recording system using an ink composition include, for example, an ink jet recording system, a recording system using writing utensils, such as pens, and other various printing systems. Particularly preferably, the ink composition according to the present invention is used in the ink jet recording system.

The ink composition according to the present invention comprises at least a pigment, a glycol ether, and water. The pigment used in the present invention is dispersible and/or soluble in water without the aid of any dispersant. Further, in the present invention, the term "glycol ether" refers to one member or a mixture of at least two members selected from the group consisting of diethylene glycol mono-n-butyl ether, triethylene glycol mono-n-butyl ether, propylene glycol mono-n-butyl ether, and dipropylene glycol mono-n-butyl ether.

The pigment which may be preferably used in the present invention has been subjected to surface treatment to bond at least one functional group selected from the group consisting of carbonyl, carboxyl, hydroxyl, and sulfonyl groups or a salt thereof onto the surface thereof, permitting the pigment to be dispersed and/or dissolved in water without the aid of any dispersant. Specifically, such a pigment may be prepared by grafting the functional group or a molecule containing the functional group onto the surface of carbon black by physical treatment, such as treatment using vacuum plasma, or chemical treatment. In the present invention, a single kind of the functional group or a plurality of kinds of the functional groups may be grafted onto one carbon black particle. The kind of the functional group and the degree of grafting may be suitably determined by taking into consideration the dispersion stability in the ink, the color density, the drying property on the front face of the ink jet recording head and the like.

In the present invention, the state of a pigment stably present in water without the aid of any dispersant is expressed as "being dispersed and/or dissolved." There are many cases where it is difficult to distinguish the state of dissolution from the state of dispersion. In the present invention, so far as a pigment is stably present in water without the aid of any dispersant, such a pigment may be used regardless of whether the pigment is present in a dispersed state or a dissolved state. Therefore, in the present specification, although a pigment which can be stably present in water without the aid of any dispersant is often referred to as a "water-soluble pigment," this does not mean the exclusion of pigments in a dispersed state.

The above pigments which may be preferably used in the present invention can be prepared, for example, by a method described in Japanese Patent Laid-Open No. 3498/1986.

The amount of the pigment added to the ink composition is preferably 2 to 15% by weight, more preferably about 4 to 10% by weight.

The glycol ether added, in combination with the pigment, to the ink composition of the present invention is selected from diethylene glycol mono-n-butyl ether, triethylene glycol mono-n-butyl ether, propylene glycol mono-n-butyl ether, and dipropylene glycol mono-n-butyl ether.

In general, a pigment is dispersed with the aid of a dispersant in an ink composition.

Experiments conducted by the present inventors, the addition of a glycol ether to an ink composition containing a pigment for the purpose of improving the penetration of the ink have revealed that a stable dispersion is broken causing agglomeration or thickening of the ink.

In order to improve the penetration of the ink composition containing a pigment dispersible and/or soluble in water without the aid of any dispersant, we have attempted to add a glycol ether. As a result, they have found that the addition of the above four glycol ethers can effectively prevent bleeding or feathering. This is surprising because other glycol ethers than the above four glycol ethers cannot reduce or can only slightly reduce the bleeding or feathering.

The amount of the glycol ether added to the ink composition according to the present invention is preferably about 3 to 30% by weight, more preferably about 5 to 10% by weight.

According to a preferred embodiment of the present invention, some of the above glycol ethers have low water solubility. Therefore, preferably, the following component is added to improve the solubility. Components usable herein include diols and glycols, such as other glycol ethers having high water solubility, thiodiglycol, 1,4-butanediol, 1,5-pentanediol, 1,6-hexanediol, propylene glycol, dipropylene glycol, and tripropylene glycol; and surfactants.

According to a preferred embodiment of the present invention, the ink composition contains an acetylene glycol surfactant. Examples of acetylene glycol surfactants include 2,4,7,9-tetramethyl-5-decyne-4,7-diol, 3,6-dimethyl-4-octyne-3,6-diol, and 3,5-dimethyl-1-hexyne-3-ol, for example, Surfynol 104, 82, 465, 485 and TG manufactured by Nissin Chemical Industry Co., Ltd. In particular, the use of Surfynol 104 or Tg can offer good record quality.

The amount of the acetylene glycol surfactant added is preferably about 0.1 to 5% by weight, more preferably about 0.5 to 1.5% by weight, based on the ink composition. The addition of the acetylene glycol in the above amount results in further reduced bleeding or feathering.

Some acetylene glycol surfactants, for example, Surfynol 104 and TG, have low solubility in water due to low HLB. The low solubility can be improved by adding a component, such as a glycol ether, a glycol, or a surfactant, to the ink composition.

According to a preferred embodiment of the present invention, the ink composition contains a glycol in order to prevent clogging of nozzles of the ink jet recording head. Preferred glycols include water-soluble glycols, and examples thereof include ethylene glycol, diethylene glycol, triethylene glycol, propylene glycol, dipropylene glycol, tripropylene glycol, polyethylene glycol having a molecular weight of not more than 600, 1,3-propylene glycol, isopropylene glycol, isobutylene glycol, 1,4-butanediol, 1,3-butanediol, 1,5-pentanediol, 1,6-hexanediol, glycerin, meso-erythritol, and pentaerythritol.

Other additives which are further useful for preventing the clogging of nozzles include thiodiglycol, 1,4-butanediol, 1,5-pentanediol, 1,6-hexanediol, propylene glycol, dipropylene glycol, tripropylene glycol, neopentyl glycol, 2-methyl-2,4-pentanediol, trimethylolpropane, and trimethylolethane. They may be used alone or as a mixture of two or more.

The amount of the above component which may be added in order to prevent clogging may be properly determined so as to attain the contemplated purpose. For example, in the case of a glycol, the amount is preferably about 3 to 25% by weight.

According to a preferred embodiment, the ink composition of the present invention may further comprise a water-soluble organic solvent in order to improve the solubility of the glycol ether having low solubility in water, to improve the penetration of the ink into a recording medium, for example, paper, or to prevent clogging of the nozzle. Preferred examples of the water-soluble organic solvent include: alkyl alcohols having 1 to 4 carbon atoms, such as ethanol, methanol, butanol, propanol and isopropanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol-mono-t-butyl ether, diethylene glycol mono-t-butyl ether, 1-methyl-1-methoxy butanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; formamide; acetamide; dimethylsulfoxide; sorbitol; sorbitan; acetin; diacetin; triacetin; and sulfolane. The amount of the water-soluble organic solvent added is preferably about 5 to 60% by weight based on the total amount of the ink composition.

According to a preferred embodiment of the present invention, the ink composition may contain other surfactant (s) in order to regulate the penetration of the ink composition. Preferably, this surfactant has good compatibility with the ink composition. Among surfactants, those having high penetration and stability are preferred. Preferred specific examples thereof include amphoteric surfactants and nonionic surfactants. Amphtoteric surfactants include, for example, lauryldimethylaminoacetic acid betaine, 2-alkyl-N-carboxymethyl-N-hydroxyethylimidazolinium betaine, coconut oil fatty acid amide propyldimethylaminoacetic acid betaine, polyoctylpolyaminoethylglycine and other imidazoline derivatives. Examples of nonionic surfactants include ether nonionic surfactants, such as polyoxyethylene nonylphenyl ether, polyoxyethylene octylphenol ether, polyoxyethylene dodecylphenyl ether, polyoxyethylene alkylallyl ether, polyoxyethylene oleyl ether, polyoxyethylene lauryl ether, polyoxyethylene alkyl ethers and polyoxyalkylene alkyl ether, ester nonionic surfactants, such as polyoxyethyleneoleic acid, polyoxyethyleneoleic acid esters, polyoxyethylenedistearic acid esters, sorbitan laurate, sorbitan monostearate, sorbitan monooleate, sorbitan sesquioleate, polyoxyethylene monooleate and polyoxyethylene stearate, and other nonionic surfactants, such as fluorosurfactants including fluoroalkyl esters, and salts of perfluoroalkylcarboxylic acids.

According to a preferred embodiment of the present invention, the ink composition may further comprise a saccharide. The addition of the saccharide can effectively prevent the clogging of the nozzle in the ink jet recording head. The saccharide may be any of monosaccharides and polysaccharides, and examples thereof include glucose, mannose, fructose, ribose, xylose, arabinose, lactose, galactose, aldonic acid, glucitose, maltose, cellobiose, sucrose, trehalose, and maltotriose and, further, alginic acid and salts thereof, cyclodextrins, and celluloses. The amount of the saccharide added is preferably about 1 to 10% by weight, more preferably 3 to 7%.

Further, according to a preferred embodiment of the present invention, the ink composition may contain various additives for the purpose of improving various properties of the ink composition, such as antiseptic agents, mildewproofing agents, pH adjustors, dye dissolution assistants, antioxidants, conductivity modifiers, surface tension modifiers, and oxygen-absorbing agents.

Specific examples of the antiseptic and mildewproofing agents include sodium benzoate, sodium pentachlorophenol, sodium 2-pyridinethiol-1-oxide, sodium sorbicate, sodium dehydroacetate and 1,2-dibenzothiazolin-3-one (Proxel CRL, Proxel BDN, Proxel GXL, Proxel XL-2 and Proxel TN, manufactured by ICI).

Examples of the pH adjustor, dye dissolution assistant, and antioxidant include amines, such as a diethanolamine, triethanolamine, propanolamine, and morpholine and modification products thereof, inorganic salts, such as potassium hydroxide, sodium hydroxide, and lithium hydroxide, ammonium hydroxide, quaternary ammonium hydroxide (such as tetramethylammonium), carbonates and phosphates, such as potassium carbonate, sodium carbonate, and lithium carbonate, or N-methyl-2-pyrrolidone, ureas, such as urea, thiourea, and tetramethylurea, allophanates, such as allophanate and methyl allophanate, biurets, such as biuret, dimethylbiuret, and tetramethylbiuret, and L-ascorbic acid and salts thereof.

Further, the ink composition according to the present invention may contain antioxidants and ultraviolet absorbers. Examples of commercially available products thereof include Tinuvin 328, 900, 1130, 384, 292, 123, 144, 622, 770, and 292, Irgacor 252, 153, Irganox 1010, 1076, 1035, and MD 1024, manufactured by CIBA-GEIGY.

Furthermore, the ink composition of the present invention may contain viscosity modifiers, and specific examples thereof include rosins, alginic acids, polyvinyl alcohol, hydroxypropyl cellulose, carboxymethyl cellulose, hydroxyethyl cellulose, methyl cellulose, polyacrylates, polyvinylpyrrolidone, and gum arabic starch.

According to a preferred embodiment, the ink composition of the present invention may further comprise a dye in order to improve the color development of the pigment or to improve the color density. Examples of dyes usable herein include direct dyes, acid dyes, basic dyes, reactive dyes, and food dyes.

Specific preferred examples of dyes usable in the present invention include:

direct dyes, for example, C.I. Direct Black 2, 4, 9, 11, 14, 17, 19, 22, 27, 32, 36, 41, 48, 51, 56, 62, 71, 74, 75, 77, 78, 80, 105, 106, 107, 108, 112, 113, 117, 132, 146, 154, 168, 171, and 194, C.I. Direct Yellow 1, 2, 4, 8, 11, 12, 24, 26, 27, 28, 33, 34, 39, 41, 42, 44, 48, 50, 51, 58, 72, 85, 86, 87, 88, 98, 100, 110, 127, 135, 141, 142 and 144, C.I. Direct Orange 6, 8, 10, 26, 29, 39, 41, 49, 51, 62 and 102, C.I. Direct Red 1, 2, 4, 8, 9, 11, 13, 15, 17, 20, 23, 24, 28, 31, 33, 37, 39, 44, 46, 47, 48, 51, 59, 62, 63, 73, 75, 77, 79, 80, 81, 83, 84, 85, 87, 89, 90, 94, 95, 99, 101, 108, 110, 145, 189, 197, 224, 225, 226, 227, 230, 250, 256 and 257, C.I. Direct Violet 1, 7, 9, 12, 35, 48, 51, 90 and 94, C.I. Direct Blue 1, 2, 6, 8, 12, 15, 22, 25, 34, 69, 70, 71, 72, 75, 76, 78, 80, 81, 82, 83, 86, 87, 90, 98, 106, 108, 110, 120, 123, 158, 163, 165, 192, 193, 194, 195, 196, 199, 200, 201, 202, 203, 207, 218, 236, 237, 239, 246, 258 and 287, C.I. Direct Green 1, 6, 8, 28, 33, 37, 63 and 64, and C.I. Direct Brown 1A, 2, 6, 25, 27, 44, 58, 95, 100, 101, 106, 112, 173, 194, 195, 209, 210 and 211;

acid dyes, for example, C.I. Acid Black 1, 2, 7, 16, 17, 24, 26, 28, 31, 41, 48, 52, 58, 60, 63, 94, 107, 109, 112, 118, 119, 121, 122, 131, 155 and 156, C.I. Acid Yellow 1, 3, 4, 7, 11, 12, 13, 14, 17, 18, 19, 23, 25, 29, 34, 36, 38, 40, 41, 42, 44, 49, 53, 55, 59, 61, 71, 72, 76, 78, 79, 99, 111, 114, 116, 122, 135, 142, 161 and 172, C.I.Acid Orange 7, 8, 10, 19, 20, 24, 28, 33, 41, 45, 51, 56 and 64, C.I. Acid Red 1, 4, 6, 8, 13, 14, 15, 18, 19, 21, 26, 27, 30, 32, 34, 35, 37, 40, 42, 44, 51, 52, 54, 57, 80, 82, 83, 85, 87, 88, 89, 92, 94, 97, 106, 108, 110, 111, 114, 115, 119, 129, 131, 134, 135, 143, 144, 152, 154, 155, 172, 176, 180, 184, 186, 187, 249, 254, 256, 289, 317 and 318, C.I. Acid Violet 7, 11, 15, 34, 35, 41, 43, 49, 51 and 75, C.I. Acid Blue 1, 7, 9, 15, 22, 23, 25, 27, 29, 40, 41, 43, 45, 51, 53, 55, 56, 59, 62, 78, 80, 81, 83, 90, 92, 93, 102, 104, 111, 113, 117, 120, 124, 126, 138, 145, 167, 171, 175, 183, 229, 234, 236 and 249, C.I. Acid Green 3, 9, 12, 16, 19, 20, 25, 27, 41 and 44, and C.I. Acid Brown 4 and 14;

basic dyes, for example, C.I. Basic Black 2 and 8, C.I. Basic Yellow 1, 2, 11, 14, 21, 32 and 36, C.I. Basic Orange 2, 15, 21 and 22, C.I. Basic Red 1, 2, 9, 12, 13 and 37, C.I. Basic Violet 1, 3, 7, 10 and 14, C.I. Basic Blue 1, 3, 5, 7, 9, 24, 25, 26, 28 and 29, C.I. Basic Green 1 and 4, and C.I. Basic Brown 1 and 12.

reactive dyes, for example, C.I. Reactive Black 1, 3, 5, 6, 8, 12 and 14, C.I. Reactive Yellow 1, 2, 3, 12, 13, 14, 15 and 17, C.I. Reactive Orange 2, 5, 7, 16, 20 and 24, C.I. Reactive Red 6, 7, 11, 12, 15, 17, 21, 23, 24, 35, 36, 42, 63, 66, 84 and 184, C.I. Reactive Violet 2, 4, 5, 8 and 9, C.I. Reactive Blue 2, 5, 7, 12, 13, 14, 15, 17, 18, 19, 20, 21, 25, 27, 28, 37, 38, 40 and 41, C.I. Reactive Green 5 and 7, and C.I. Reactive Brown 1, 7 and 16;

food dyes, for example, C.I. Food Black 1 and 2, C.I. Food Yellow 3, 4 and 5, C.I. Food Red 2, 3, 7, 9, 14, 52, 87, 92, 94, 102, 104, 105 and 106, C.I. Food Violet 2, C.I. Food Blue 1 and 2, and C.I. Food Green 2 and 3.

Further, it is also possible to utilize Kayaset Black 009A, Direct Deep Black XA, and Direct Special Black AXN, manufactured by Nippon Kayaku Co., Ltd., Bayscript Black SP Liquid, Levacell Turquoise Blue KS-6GLL and Pyranine, manufactured by Bayer Japan Ltd., JI. BK-2 and JI. BK-3, manufactured by Sumitomo Chemical Co., Ltd., JPK-81L, JPX-127L, JPK-139 and C.I. Fluorescent Brightening Agent 14, 22, 24, 32, 84, 85, 86, 87, 90, 134, 166, 167, 169, 175, 176 and 177, manufactured by Orient Chemical Industries, Ltd. and other dyes.

According to a preferred embodiment of the present invention, examples of dyes which may be added to the ink composition include water-soluble dyes represented by the following formulae (I) and (II):

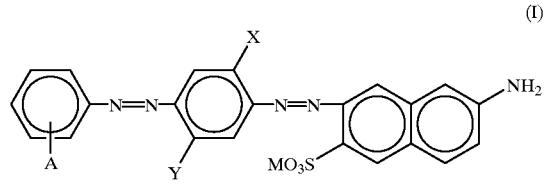

(I)

wherein A represents POOM or COOM, X and Y each independently represent an alkoxy or alkyl group, M represents an alkali metal, H, or $NH_4$ or an organic amine; and

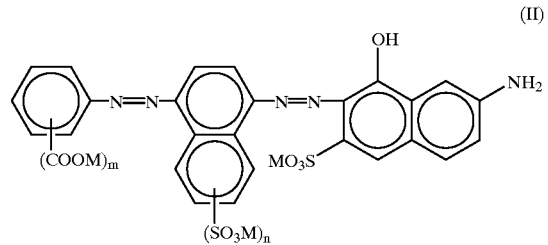

(II)

wherein M represents an alkali metal, H, or $NH_4$ or an organic amine, m is 1 or 2 and n is 0 or 1.

The addition of these dyes can advantageously improve the print density. Even in the case of a pigment which provides a reddish, bluish, or yellowish black, the use thereof in combination with the dye can create a better black color.

The amount of the water-soluble dye represented by the formula (I) or (II) is preferably 50 to less than 200% by weight based on the pigment.

Preferred specific examples of the water-soluble dyes represented by the formulae (I) and (II) include the following dyes (1) to (23):

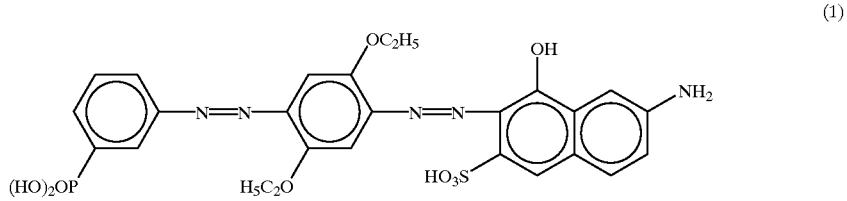

(1)

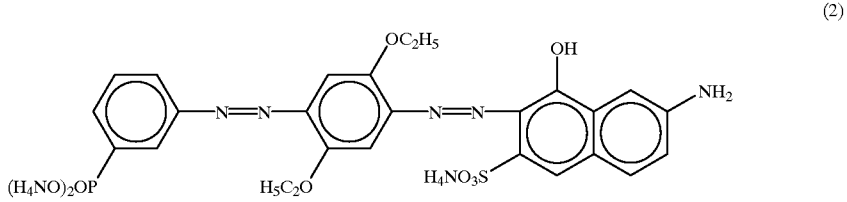

(2)

(3)
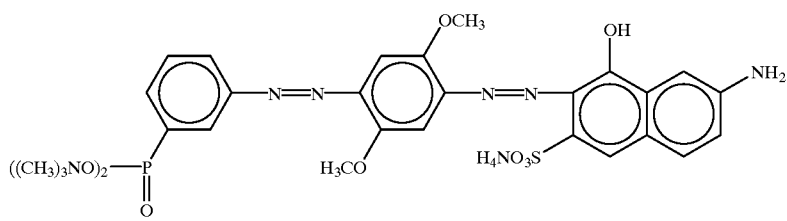
(4)
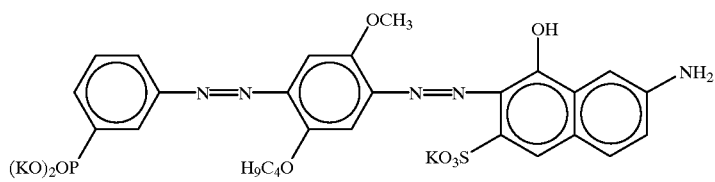
(5)
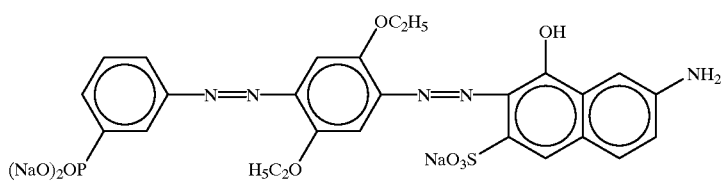
(6)
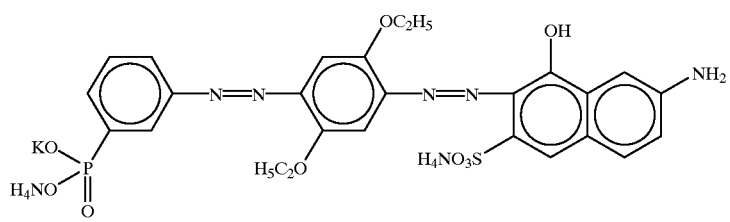
(7)
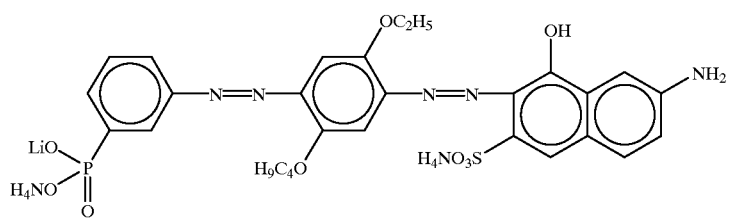
(8)
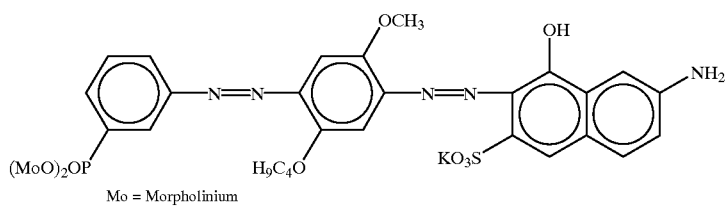
Mo = Morpholinium
(9)
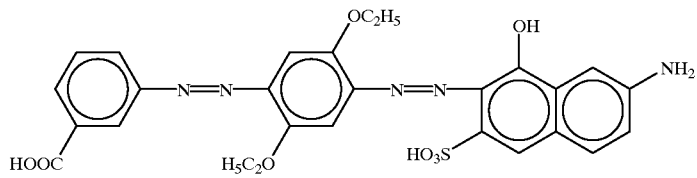

-continued
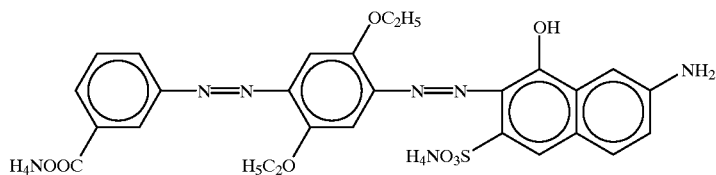
(10)
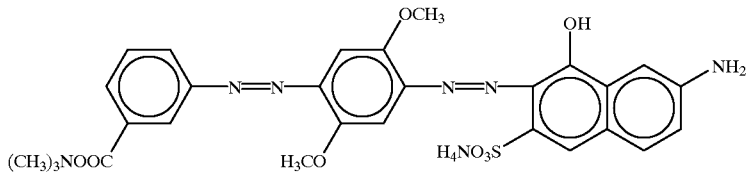
(11)
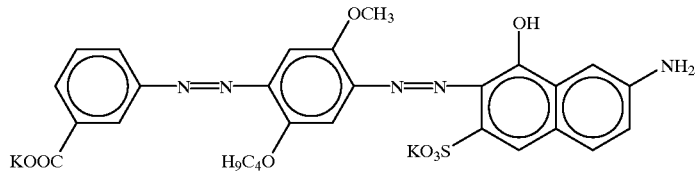
(12)
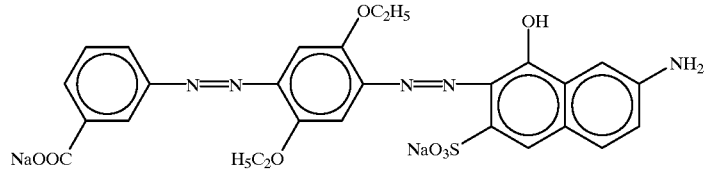
(13)
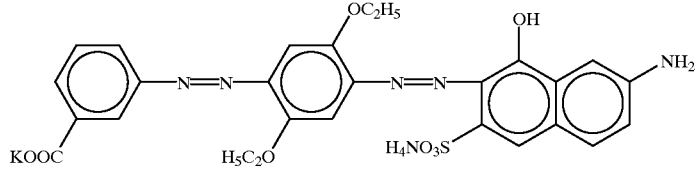
(14)
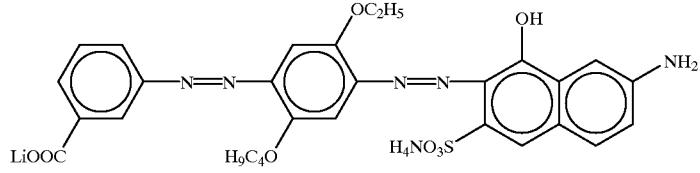
(15)
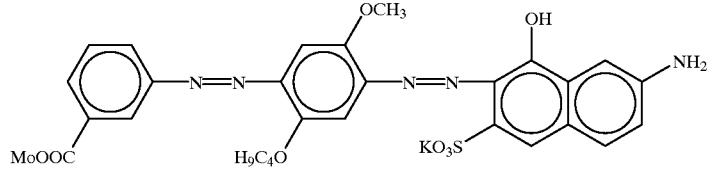
(16)
Mo = Morpholinium -continued
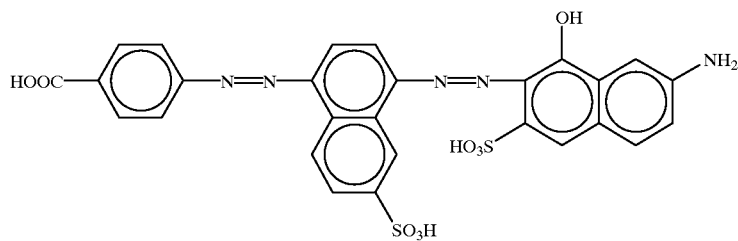
(17)
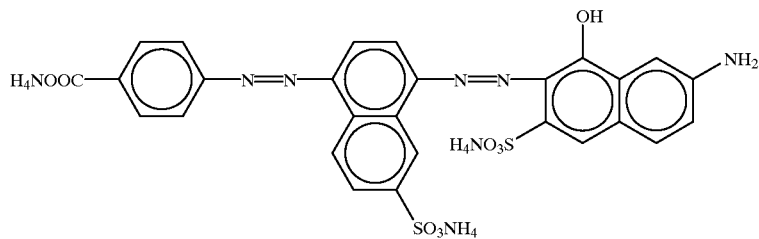
(18)
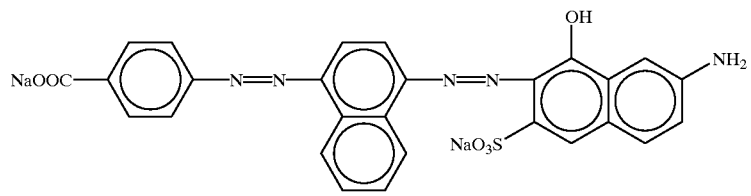
(19)
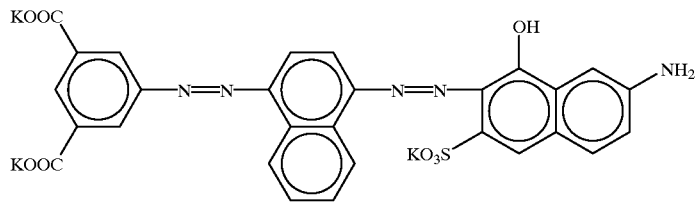
(20)
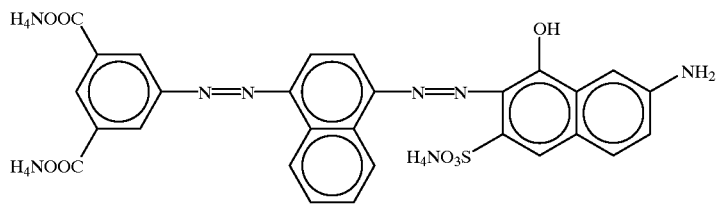
(21)
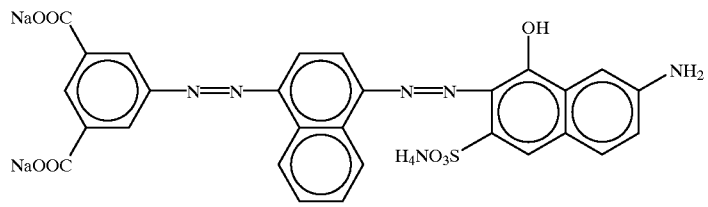
(22)

-continued

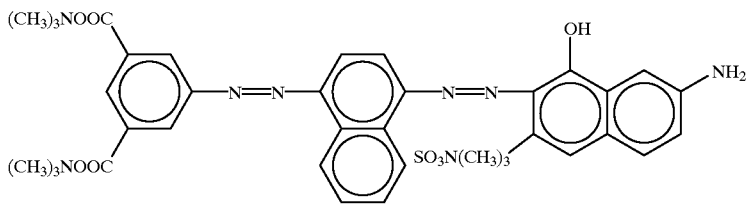

(23)

According to a preferred embodiment of the present invention, the ink composition may further comprise a surfactant and/or a regulated polymerization type water-soluble resin. In the ink composition of the present invention, the surfactant and the regulated polymerization type water-soluble resin function to further accelerate or stabilize the dispersion of the pigment. Further, in the ink jet recording method, the surfactant and the regulated polymerization type water-soluble resin can improve the color density of the print and ejection stability at high temperatures.

Examples of surfactants usable herein include those described above.

Regulated polymerization type water-soluble resins usable in the present invention include alternating copolymers and block copolymers which have a portion having at the terminal or intermediate of the molecule a functional group bondable, by a hydrogen bond or a covalent bond, to the functional group of a pigment and a hydrophilic group at the terminal of the molecule and have a regularly arranged molecular structure. Specific examples of regulated polymerization type resins usable herein include Solsperse S3000, S5000, S9000, S12000, S13240, S13440, S20000, S22000, S24000GR, S26000, S27000, and S28000, manufactured by Zeneca Co., Ltd., Osaka-shi, Osaka.

Reaction solution and ink jet recording method using two liquids

The ink composition according to the present invention may form an image by ink jet recording. Combination of the ink composition of the present invention with the recording method using the so-called "two liquids" can offer a better image. Specifically, an image having no significant bleeding or feathering can be realized even on plain paper. Further, as compared with the sole use of the ink composition of the present invention, the combination of the ink composition of the present invention with the ink jet recording method using two liquids can offer improved print density.

The ink jet recording method according to the present invention involves the step of depositing a reaction solution containing a reactant and the above ink composition onto a recording medium. The term "reactant" used herein refers to an agent which can break the state of dispersion and/or dissolution of the pigment and can agglomerate the pigment.

In the recording method using two liquids, like the ink jet recording method according to the present invention, a good print can be realized by contact of the reaction solution with the ink composition. Specifically, upon contact of the reaction solution with the ink composition, the reactant contained in the reaction solution breaks the state of dispersion of the pigment and other components in the ink composition, leading to agglomeration of the pigment and the like. The agglomerate is considered to deposit onto the recording medium, realizing a print having high color density and no significant bleeding or feathering and unevenness. Further, advantageously, in the case of a color image, uneven color-to-color intermixing in the region of boundary between different colors, that is, color bleeding, can be effectively prevented.

Therefore, also in the present invention, the reaction solution is brought into contact with the ink composition. In this case, the step of ejecting droplets of the ink composition onto the recording medium to record an image may be conducted either before or after the deposition of the reaction solution onto the recording medium, with the practice of the step of recording after the deposition of the reaction solution being preferred.

The reaction solution may be selectively deposited on only the areas where the ink composition is deposited, or alternatively may be deposited on the whole area of the recording medium. The former method can minimize the consumption of the reaction solution and, hence, is cost-effective. In the former method, however, both the reaction solution and the ink composition should be deposited onto a contemplated position with certain accuracy. On the other hand, in the latter method, the requirement for the accuracy on the position of the deposition of the reaction solution and the ink composition is reduced as compared with the former method. However, the latter method is disadvantageous in that a large amount of the reaction solution is deposited onto the whole area of the recording medium, causing paper, when used as the recording medium, to be likely to curl upon drying. Therefore, which method is used may be determined by taking into consideration a combination of the ink composition with the reaction solution. When the former method is adopted, the reaction solution can be deposited by the ink jet recording method.

The reaction solution used in the present invention comprises a reactant which can break the state of dispersion of the colorant and the like in the ink composition and can agglomerate the colorant component and the like.

Reactants usable in the present invention include cationic compounds, for example, primary, secondary, tertiary, and quaternary amines and compounds having in molecule ammonium, phosphorus, and phosphonium. Further, polyallylamine, polyethyleneimine, polyvinyl pyrrolidone, polyvinyl imidazole, polyvinyl pyridine, ionene, and polydialkylallylammonium salt are also usable. Further examples of cationic compounds usable herein include those containing as a cation species a metal ion of an alkali metal, such as lithium, sodium, or potassium, an alkaline earth metal, such as magnesium or calcium, aluminum, zinc, chromium, copper, nickel, or iron, for example, salts of the above cation species with carbonic acid, bicarbonic acid, oxalic acid, succinic acid, asparagic acid, ascorbic acid, gluconic acid, glutaric acid, glutamic acid, lactic acid, butyric acid, isobutyric acid, benzoic acid, oleic acid, glyceric acid, molybdic acid, palmitic acid, phosphonic acid, patetonic acid, phosphinic acid, phthalic acid, formic acid, acetic acid, sulfurous acid, nitrous acid, nitric acid, phosphoric acid, phosphorous acid, pyrophosphoric acid, salicylic acid, silicic acid, borosilicic acid, capronic acid, capric acid, caprylic acid, lauric acid, malonic acid, maleic acid, metabisulfite, myristic acid, stearic acid, tartaric acid, bitartaric acid, aluminic acid, boric acid, hydrochloric acid, and sulfuric acid.

Further, commercially available products may be used as the reactant, and specific examples thereof include Sanfix (manufactured by Sanyo Chemical Industries, Ltd.), Protex and Fix (manufactured by Kuroda-Kako Co, Ltd.), Morin Fix Conc (manufactured by Morin Chemical Industries, Ltd., Amigen (manufactured by Dai-Ichi Kogyo Yakuhin K.K.), Epomin (manufactured by Nippon Shokubai Kagaku Kogyo Co., Ltd.), Fixoil (manufactured by Meisei Chemical Works Co., Ltd.), Neofix (manufactured by Nicca Chemical Co., Ltd.), Polyamine Sulfone (manufactured by Nitto Boseki Co., Ltd.), Polyfix (manufactured by Showa High Polymer Co., Ltd.), Nikafix (manufactured by Nippon Carbide Industries Co., Ltd.), Levogen (manufactured by Bayer), and Kaimen (manufactured by DIC-Hercules Chemicals Inc.).

In the present invention, the amount of the reactant added is preferably about 0.5 to 40% by weight, more preferably about 1 to 10% by weight. When the reactant contains a metal ion, the content of the metal ion is preferably about 0.01 to 1 mol/kg, more preferably 0.03 to 0.3 mol/kg.

Preferably, the reaction solution used in the ink jet recording method according to the present invention contains one member or a mixture of at least two members selected from the group consisting of glycol ethers, for example, diethylene glycol mono-n-butyl ether, triethylene glycol mono-n-butyl ether, propylene glycol mono-n-butyl ether, and dipropylene glycol mono-n-butyl ether. The amount of the glycol ether added is preferably about 3 to 30% by weight, more preferably about 5 to 10% by weight. The addition of the glycol ether can improve the penetration of the reaction solution into paper, resulting in reduced bleeding or feathering. Further, since the glycol ether has low vapor pressure, it is possible to prevent the ink from drying at the front end of the nozzle of the ink jet recording head. Furthermore, when recording using the ink composition is conducted with the reaction solution being penetrated into paper to some extent, an improvement in the quality of the record can be attained by virtue of the compatibility with the glycol ether as a component of the ink composition.

According to a preferred embodiment of the present invention, the reaction solution used in the ink jet recording method according to the present invention may suitably contain a component which may be added to the above ink composition. The amount of such a component added may be the same as that in the case of the addition to the above ink composition.

In order to avoid the influence of the reaction solution on printed letters or figures, the reaction solution used in the present invention is preferably colorless or light-colored so that, in general, the color of the reaction solution cannot be perceived by the human eye. In this case, preferably, the reaction solution is deposited onto the recording medium before printing of a black ink and/or a color ink.

Alternatively, a colorant component may be added to the reaction solution so that the reaction solution can serve also as a color ink composition. When the reaction solution functions also a color ink composition, the dye used in combination with the reaction solution should not cause agglomeration or thickening. In general, dyes having a polar group, such as a carboxyl group, is likely to be agglomerated by a metal ion. The present inventors have confirmed that the agglomeration of such dyes can be prevented by introducing a hydrophilic group such as a sulfone group. Therefore, even dyes which as such cannot be utilized in the present invention often become usable by the introduction of a functional group while giving consideration to the water resistance of the dyes. Specific examples of dyes which are usable or become usable by the introduction of a functional group include those cited above in connection with the ink composition.

Incorporation of a reactive component into a color ink is preferred from the viewpoint of preventing mixing between a black ink and a color ink, that is, bleeding.

According to a preferred embodiment of the present invention, the amount of the ink composition is preferably 50 to 200%, more preferably 75 to 150%, based on the amount of the reaction solution.

Further, according to a preferred embodiment of the present invention, the time taken from the deposition of the reaction solution onto the recording medium to the initiation of the printing of the ink composition is preferably not more than 3 sec, more preferably not more than 1 sec, still more preferably not more than 0.1 sec. When this time interval is short, an agglomeration reaction of the pigment in the ink composition with the reaction solution is facilitated. At the same time, the color density is increased resulting in improved record quality.

Further, according to the recording method of the present invention, when the reaction solution serves also as the color ink composition, the deposition may be performed once or a plurality of times in a single color, or alternatively may be performed once or a plurality of times after mixing of a plurality of colors. This can change the color of the undercoat, enabling the final color density after recording the ink composition to be brought to a desired one. For example, blue created by mixing cyan and magenta, green created by mixing cyan and yellow, red created by mixing magenta and yellow, and a color created by mixing all of cyan, magenta, and yellow may be used as an undercoat to improve the final color density.

An ink jet recording apparatus for practicing the ink jet recording method using two liquids according to the present invention will be described with reference to the accompanying drawings.

FIG. 1 shows an embodiment of an ink jet recording apparatus, wherein an ink composition and a reaction solution are placed in a tank and the ink composition and the reaction solution are supplied into a recording head through an ink tube. Specifically, a recording head 1 is communicated with an ink tank 2 through an ink tube 3. In this case, the interior of the ink tank 2 is partitioned into a chamber for an ink composition, optionally a plurality of chambers for a plurality of color ink compositions, and a chamber for a reaction solution.

The recording head 1 is moved along a carriage 4 by means of a timing belt 6 driven by a motor 5. On the other hand, paper 7 as a recording medium is positioned by means of a platen 8 and a guide 9 so as to face the recording head 1. In this embodiment, a cap 10 is provided. A suction pump 11 is connected to the cap 10 so that the so-called "cleaning operation" can be performed. The sucked ink composition is collected through a tube 12 into a waste ink tank 13.

FIG. 2 is an enlarged view of a nozzle face of the recording head 1. A nozzle face of the reaction solution is indicated by 1b, and a nozzle 21, through which the reaction solution is ejected, is provided in longitudinal direction. On the other hand, a nozzle face for an ink composition is indicated by 1c, and a yellow ink composition, a magenta ink composition, a cyan ink composition, and a black ink composition are ejected respectively through nozzles 22, 23, 24, and 25.

An ink jet recording method using the recording head shown in FIG. 2 will be described with reference to FIG. 3. The recording head 1 is moved in a direction indicted by an arrow A. During the movement of the recording head 1, the reaction solution is ejected from the nozzle face 1 to form a reaction solution deposited area 31 in a band form on the recording medium 7. The recording medium 7 is transferred by a predetermined length in the direction of feed of the paper indicated by an arrow B, during which time the recording head 1 is moved in a direction opposite to that indicated by the arrow A shown in the drawing and is returned to the left end of the recording medium 7. Then, the recording head 1 prints the ink composition in the reaction solution deposited area where the reaction solution has been deposited, thereby forming a printed area 32.

Alternatively, as shown in FIG. 4, in the recording head 1, all the nozzles may be arranged in the lateral direction. In the drawing, 41a and 41b designate nozzles for ejecting a reaction solution, and a yellow ink composition, a magenta ink composition, a cyan ink composition, and a black ink composition are ejected respectively through nozzles 42, 43, 44, and 45. In the recording head according to this embodiment, since the recording head 1 can perform printing in both directions in the reciprocation of the recording head on the carriage, printing at a higher speed than that in the embodiment shown in FIG. 2 can be expected.

Further, the ink jet recording apparatus according to the present invention may be constructed so that the replenishment of the ink composition is conducted by replacing a cartridge as the ink tank. Alternatively, it may be constructed so that the ink tank is integral with the recording head.

Figure 5:
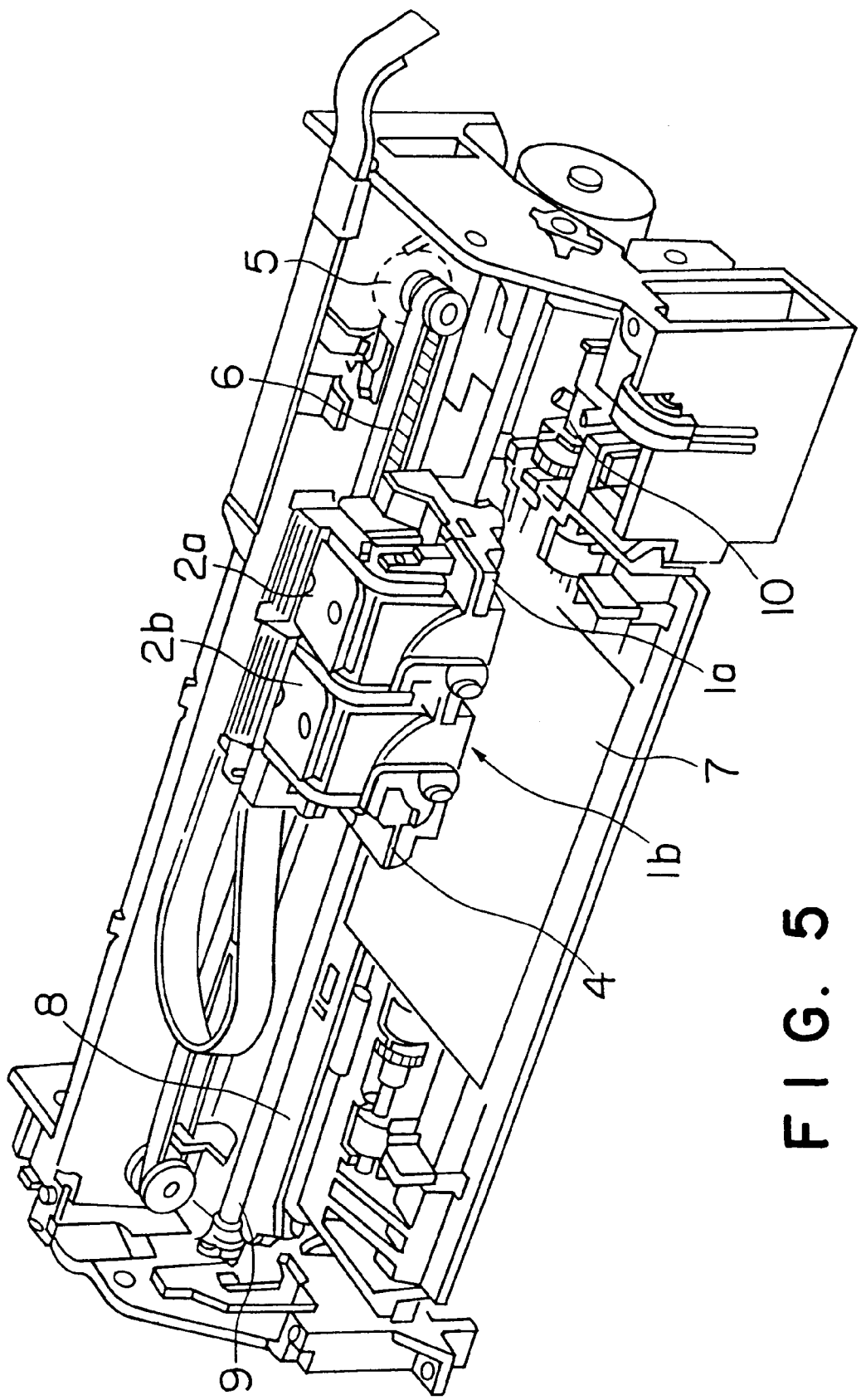
FIG. 5 is a diagram showing an ink jet recording apparatus according to the present invention, wherein an recording head is integral with an ink tank.

A preferred embodiment of the ink jet recording apparatus utilizing such an ink tank is shown in FIG. 5. In the drawing, the same members as used in the apparatus shown in FIG. 1 have the same reference numerals. In the embodiment shown in FIG. 5, recording heads 1a and 1b are integral respectively with ink tanks 2a and 2b. An ink composition and a reaction solution are ejected respectively through the recording heads 1a and 1b. Basically, printing may be conducted in the same manner as described above in connection with the apparatus shown in FIG. 1. Further, in this embodiment, the recording head 1a is moved together with the ink tank 2a on a carriage 4, while the recording head 1a is moved together with the ink tank 2b on the carriage 4.

When an ink having a relatively high content of solid matter, such as a pigment, like the ink of the present invention, is used, the ink is likely to be dried at the front end of a nozzle, through which the ink has not been ejected for a long period of time. This is in turn likely to cause thickening resulting in disturbed prints. In this case, the ink composition is preferably moved to vibrate at the front end of the nozzle to such an extent that it is not ejected as droplets through the nozzle. By this vibration of the ink, the ink is agitated permitting the ink to be stably ejected. The vibration of the ink can be achieved by applying a pressure using pressure means for ejecting the ink in a controlled manner so as not to cause ejection of the ink. The use of an electrostrictive element as the pressure means is preferred from the viewpoint of easy control. When this mechanism is used, the concentration of the pigment in the ink can be increased, enabling a pigment ink having high color density to be stably ejected.

Further, the vibration of the ink composition is effective for an ink composition having a pigment content of about 5 to 15% by weight, preferably about 7 to 10% by weight.

According to another preferred embodiment of the present invention, The ink jet recording apparatus is characterized by having such a construction that a polyurethane foam is packed into an ink cartridge for accommodating black and color inks so that the ink comes into contact with the urethane foam. In this case, a glycol ether and an acetylene glycol surfactant which may be preferably used in the present invention may be adsorbed on the urethane foam. Therefore, preferably, these compounds may be added in an excessive amount in consideration of the amount of the compounds adsorbed on the urethane foam. Further, the urethane foam can ensure a negative pressure when the ink is one which may be preferably used in the present invention. Furthermore, by virtue of the urethane foam, decomposition or occurrence of an undesired material due to components of the ink used in the present invention, which is causative of clogging, is less likely to occur. In the urethane foam, a curing catalyst containing a metal salt or cationic catalyst is not used, and the use of urethane foam comprising a polyfunctional isocyanate, such as tolylene diisocyanate or m-xylene diisocyanate, and a glycol having an average molecular weight of about 300 to 3000 compound, such as polypropylene glycol or polyethylene glycol, or a compound having a plurality of hydroxyl groups, such as glycerin, pentaerythritol, dipentaerythritol, neopentyl glycol, propylene glycol, 1, 3-butanediol, 1, 4-butanediol, or a 1,5-pentanediol, is preferred from the viewpoint of ensuring the negative pressure by virtue of good stability of the form of the foam and chemical stability.

EXAMPLES

The present invention will be described with reference to the following examples, though it is not limited to these examples only.

In the examples, the following abbreviations were used.
PGmBE: propylene glycol mono-n-butyl ether
DEGmBE: diethylene glycol mono-n-butyl ether
DPGmBE: dipropylene glycol mono-n-butyl ether
TEGmBE: triethylene glycol mono-n-butyl ether
PGmME: propylene glycol monomethyl ether
DMI: 1, 3-dimethyl-2-imidazolidinone
DPGmME: dipropylene glycol monomethyl ether
MPD: 2-methyl-2,4-pentanediol
DEGmtBE: diethylene glycol-mono-t-butyl ether
TEGmME: triethylene glycol monomethyl ether In the following examples and comparative examples, "%" is by weight.

Example A

In Example A, a carbon black having an average particle diameter of 60 to 150 µm, of which the surface has been carboxylated by chemical treatment, was used as a water-soluble pigment.

Water as the balance contained 0.1 to 1% of Proxel XL-2 as an agent for preventing the corrosion of the ink and 0.001 to 0.05% of benzotriazole as an agent for preventing the corrosion of an ink jet head member.

The following ink compositions were prepared.

Example A1

| | |
|---|---|
| Water-soluble pigment (average particle diameter: 90 µm) | 5.0% |
| PGmBE | 5.0% |
| DEGmBE | 7.0% |
| Glycerin | 6.0% |
| 1,4-Butanediol | 5.0% |
| Surfynol 104 | 1.0% |
| Ion-exchanged water | Balance |

Example A2

-continued

| | |
|---|---|
| Water-soluble pigment | 4.5% |
| DPGmBE | 5.0% |
| TEGmBE | 10.0% |
| Dipropylene glycol | 5.0% |
| Urea | 5.0% |
| Surfynol TG | 1.2% |
| Fluorosurfactant | 0.1% |
| Ion-exchanged water | Balance |

Example A3

| | |
|---|---|
| Water-soluble pigment | 5.5% |
| PGmBE | 5.0% |
| DEGmBE | 10.0% |
| Propylene glycol | 7.0% |
| Triethylene glycol | 3.0% |
| 1,5-Pentanediol | 5.0% |
| Surfynol TG | 1.4% |
| Ion-exchanged water | Balance |

Exammple A4

| | |
|---|---|
| Water-soluble pigment | 5.0% |
| DEGmBE | 10.0% |
| 1,6-Hexanediol | 5.0% |
| Tripropylene glycol | 2.0% |
| DMI | 2.0% |
| Surfynol 104 | 0.8% |
| Surfynol 465 | 0.4% |
| Ion-exchanged water | Balance |

The following reaction solutions were prepared.
Reaction solution A1

| | |
|---|---|
| Direct Blue 199 | 3.0% |
| PGmBE | 5.0% |
| DPGmME | 10.0% |
| MPD | 3.0% |
| Trimethylolpropane | 3.0% |
| Magnesium nitrate | 3.0% |
| Surfynol TG | 1.2% |
| Triethanolamine | 0.9% |
| Ion-exchanged water | Balance |

Reaction solution A2

| | |
|---|---|
| Acid Red 289 | 3.5% |
| PGmBE | 5.0% |
| DPGmBE | 2.0% |
| DEGmBE | 10.0% |
| Neopentyl glycol | 5.0% |
| Calcium L-ascorbate | 3.0% |
| Surfynol TG | 0.5% |
| Surfynol 104 | 0.5% |
| Ion-exchanged water | Balance |

Reaction solution A3

| | |
|---|---|
| Direct Yellow 132 | 5.0% |
| TEGmBE | 10.0% |
| Glycerin | 5.0% |
| Trimethylolpropane | 5.0% |
| Trimethylolethane | 5.0% |
| Magnesium acetate | 2.0% |
| Calcium acetate | 1.0% |
| Surfynol 465 | 1.0% |
| Surfynol TG | 0.6% |
| Triethanolamine | 0.1% |
| Ion-exchanged water | Balance |

Reaction solution A4

| | |
|---|---|
| Bonjet Black 817 | 5.5% |
| DPGmBE | 5.0% |
| DEGmtBE | 5.0% |
| DEGmBE | 5.0% |
| Diethylene glycol | 5.0% |
| Tetrapropylene glycol | 5.0% |
| Magnesium benzoate | 2.5% |
| Surfynol 104 | 1.0% |
| Ion-exchanged water | Balance |

Reaction solution A5

| | |
|---|---|
| TEGmBE | 10.0% |
| Glycerin | 5.0% |

-continued

| | |
|---|---|
| Trimethylolpropane | 5.0% |
| Trimethylolethane | 5.0% |
| Magnesium acetate | 2.0% |
| Calcium acetate | 1.0% |
| Surfynol 465 | 1.0% |
| Surfynol TG | 0.6% |
| Triethanolamine | 0.1% |
| Ion-exchanged water | Balance |

Then, the following comparative ink compositions were prepared.

In the comparative ink compositions, a pigment dispersion prepared by dispersing a carbon black having an average particle diameter of 60 to 150 μm with the aid of a styrene-acrylic dispersant was used.

Comparative Example A1

| | |
|---|---|
| Pigment dispersion | 5.0% |
| TEGmME | 10.0% |
| Ethylene glycol | 8.0% |
| Dispersant | 3.0% |
| DEGmME | 7.0% |
| Ion-exchanged water | Balance |

Comparative Example A2

| | |
|---|---|
| Pigment dispersion | 5.5% |
| Glycerin | 10.0% |
| Diethylene glycol | 10.0% |
| Dispersant | 5.0% |
| Ion-exchanged water | Balance |

Comparative Example A3

| | |
|---|---|
| Pigment dispersion | 5.5% |
| Diethylene glycol | 10.0% |
| Surfynol 465 | 1.0% |
| Ion-exchanged water | Balance |

Printing Test

Printing was performed, on various recording papers listed in the following Table 1, using the ink compositions prepared in Examples A1 to A4 and Comparative Examples A1 to A3 by means of an ink jet printer MJ-700V2C manufactured by Seiko Espon Corporation.

Further, prior to printing using the ink compositions, solid printing (100% duty) of the reaction solution A5 was performed by meas of the same head as the ink jet printer MJ-700V2C onto the recording medium, and printing using the ink compositions was performed in the same manner as described above.

These records were evaluated for "bleeding" and "feathering." In this case, the term "bleeding" used herein refers to fine uneven penetration of ink, which lowers the circularity of the dot, and the term "feathering" used herein refers to linear uneven penetration of ink extending in a streak form along the fibers of the paper. These phenomena were visually inspected to evaluate the influence thereof on the image. The results were evaluated according to the following criteria:

⊚(excellent): Not influenced the image.

○(good): Influenced the image but pose no problem in practical use of the ink composition.

Δ: Influenced the image and pose problem in practical use of the ink composition.

×: Influenced the image, rendering the ink composition unsuitable for practical use.

The results were as tabulated in Table 1.

TABLE 1

|  |  | Ex. A | | | | | | | | Comp. Ex. A | | | | | |
| --- | --- | --- | --- | --- | --- | --- | --- | --- | --- | --- | --- | --- | --- | --- | --- |
|  |  | Undercoat not provided | | | | Undercoat provided | | | | Undercoat not provided | | | Undercoat provided | | |
| Test item | Type of paper | 1 | 2 | 3 | 4 | 1 | 2 | 3 | 4 | 1 | 2 | 3 | 1 | 2 | 3 |
| Bleeding | Conqueror Paper | ⊚ | ⊚ | ⊚ | ⊚ | ⊚ | ⊚ | ⊚ | ⊚ | ○ | ⊚ | ○ | ⊚ | ⊚ | ○ |
|  | Favorit Paper | ⊚ | ⊚ | ⊚ | ⊚ | ⊚ | ⊚ | ⊚ | ⊚ | Δ | ○ | ○ | ○ | ⊚ | ⊚ |
|  | Modo Copy Paper | ○ | ○ | ○ | ○ | ⊚ | ⊚ | ⊚ | ⊚ | X | Δ | X | Δ | ○ | Δ |
|  | Rapid Copy Paper | ⊚ | ⊚ | ⊚ | ○ | ⊚ | ⊚ | ⊚ | ⊚ | Δ | ○ | ○ | ○ | ⊚ | ⊚ |
|  | EPSON EPP Paper | ○ | ○ | ○ | ○ | ⊚ | ⊚ | ⊚ | ⊚ | X | Δ | X | Δ | ○ | Δ |
|  | Xerox P Paper | ○ | ○ | ○ | ○ | ⊚ | ⊚ | ⊚ | ⊚ | X | Δ | X | Δ | ○ | Δ |
|  | Xerox 4024 Paper | ○ | ⊚ | ○ | ⊚ | ⊚ | ⊚ | ⊚ | ⊚ | Δ | ○ | Δ | ○ | ⊚ | Δ |
|  | Xerox 10 Paper | ⊚ | ⊚ | ○ | ○ | ⊚ | ⊚ | ⊚ | ⊚ | Δ | Δ | Δ | ○ | ○ | Δ |
|  | Neenha Bond Paper | ○ | ○ | ○ | ○ | ⊚ | ⊚ | ⊚ | ⊚ | X | Δ | Δ | Δ | ○ | Δ |
|  | Ricopy 6200 Paper | ⊚ | ⊚ | ⊚ | ⊚ | ⊚ | ⊚ | ⊚ | ⊚ | Δ | Δ | Δ | ○ | ○ | Δ |
|  | Yamayuri Paper | ○ | ○ | ○ | ○ | ⊚ | ⊚ | ⊚ | ⊚ | X | X | X | Δ | X | Δ |
|  | Xerox R Paper | ○ | ○ | ○ | ○ | ⊚ | ⊚ | ⊚ | ⊚ | X | X | X | Δ | X | Δ |
| Feathering | Conqueror Paper | ⊚ | ⊚ | ⊚ | ○ | ⊚ | ⊚ | ⊚ | ⊚ | X | Δ | X | Δ | ○ | Δ |
|  | Favorit Paper | ⊚ | ⊚ | ○ | ○ | ⊚ | ⊚ | ⊚ | Δ | Δ | Δ | ○ | ○ | ○ | ○ |
|  | Modo Copy Paper | ○ | ○ | ○ | ○ | ⊚ | ⊚ | ⊚ | ⊚ | Δ | X | Δ | ○ | Δ | ○ |
|  | Rapid Copy Paper | ○ | ○ | ○ | ○ | ⊚ | ⊚ | ⊚ | ⊚ | X | X | Δ | Δ | Δ | ○ |
|  | Xerox P Paper | ○ | ○ | ○ | ○ | ⊚ | ⊚ | ⊚ | ⊚ | X | Δ | X | Δ | ○ | Δ |
|  | Xerox 4024 Paper | ○ | ○ | ○ | ○ | ⊚ | ⊚ | ⊚ | ⊚ | X | X | X | Δ | X | Δ |
|  | Yamayuri Paper | ○ | ○ | ○ | ○ | ⊚ | ⊚ | ⊚ | ⊚ | X | X | X | Δ | X | Δ |
|  | Xerox R Paper | ○ | ○ | ○ | ○ | ⊚ | ⊚ | ⊚ | ⊚ | X | X | X | Δ | X | Δ |

In Table 1, Ricopy 6200 Paper, Yamayuri Paper, and Xerox R Paper are recycled papers.

Thereafter, the reaction solutions A1 to A4 were printed on the recording media, and printing was performed using the ink composition of Example A1. Printing was performed by means of the same printer as used above.

The OD values of the prints thus obtained were measured. The results were as shown in Table 2.

TABLE 2

|  | Reaction solution | | | | |
| --- | --- | --- | --- | --- | --- |
| Type of paper | A1 | A2 | A3 | A4 | None |
| Conqueror Paper | 1.40 | 1.39 | 1.35 | 1.44 | 1.17 |
| Favorit Paper | 1.43 | 1.42 | 1.37 | 1.47 | 1.20 |
| Modo Copy Paper | 1.43 | 1.43 | 1.37 | 1.48 | 1.21 |
| Rapid Copy Paper | 1.45 | 1.44 | 1.39 | 1.49 | 1.21 |
| EPSON EPP Paper | 1.40 | 1.38 | 1.32 | 1.42 | 1.14 |
| Xerox P Paper | 1.43 | 1.42 | 1.35 | 1.44 | 1.17 |
| Xerox 4024 Paper | 1.38 | 1.36 | 1.32 | 1.40 | 1.08 |
| Xerox 10 Paper | 1.34 | 1.31 | 1.30 | 1.34 | 1.05 |
| Neenha Bond Paper | 1.36 | 1.35 | 1.33 | 1.39 | 1.08 |
| Ricopy 6200 Paper | 1.41 | 1.40 | 1.42 | 1.49 | 1.23 |
| Yamayuri Paper | 1.50 | 1.48 | 1.46 | 1.53 | 1.34 |
| Xerox R Paper | 1.40 | 1.40 | 1.34 | 1.45 | 1.17 |

Example B

In the following examples, carbon blacks having an average particle diameter of 80 to 130 $\mu$m, of which the surface has been chemically treated to graft thereon functional groups, such as a carbonyl group, a carboxyl group, and a hydroxyl group, were used as a water-soluble pigment. Numerical values within the parentheses in water-soluble pigments 1 to 8 are the average particle diameters ($\mu$m) of the carbon blacks Water as the balance contained 0.1 to 1% of Proxel XL-2 as an agent for preventing the corrosion of the ink and 0.001 to 0.05% of benzotriazole as an agent for preventing the corrosion of an ink jet head member.

The following ink compositions were prepared.

Example B1

| | |
| --- | --- |
| Water-soluble pigment 1 (105) | 5.0% |
| Food Black 2 | 1.0% |
| PGmBE | 5.0% |
| DEGmBE | 7.0% |
| Glycerin | 6.0% |
| 1,4-Butanediol | 5.0% |
| Surfynol 104 | 1.0% |
| Triethanolamine | 0.8% |
| Ion-exchanged water | Balance |

Example B2

| | |
| --- | --- |
| Water-soluble pigment 2 (85) | 4.5% |
| Direct Black 154 | 1.0% |
| DPGmBE | 5.0% |
| TEGmBE | 10.0% |
| Dipropylene glycol | 5.0% |
| Urea | 5.0% |
| Surfynol TG | 1.2% |
| Fluorosurfactant | 0.1% |
| Ion-exchanged water | Balance |

Example B3

| | |
| --- | --- |
| Water-soluble pigment 3 (120) | 5.5% |
| Acid Black 63 | 0.5% |
| PGmBE | 5.0% |
| DEGmBE | 10.0% |
| Propylene glycol | 7.0% |
| Triethylene glycol | 3.0% |
| 1,5-Pentanediol | 5.0% |
| Surfynol TG | 1.4% |
| Potassium hydroxide | 0.1% |
| Ion-exchanged water | Balance |

Example B4

| | |
| --- | --- |
| Water-soluble pigment 4 (80) | 5.0% |
| Bayscript Black SPL | 1.0% |
| DEGmBE | 10.0% |
| 1,6-Hexanediol | 5.0% |
| Tripropylene glycol | 2.0% |
| DMI | 2.0% |
| Surfynol 104 | 0.8% |

-continued

| | |
|---|---|
| Surfynol 465 | 0.4% |
| Sodium benzoate | 0.1% |
| Ion-exchanged water | Balance |
| Example B5 | |
| Water-soluble pigment 5 (95) | 5.0% |
| Direct Black 11 | 1.0% |
| PGmBE | 5.0% |
| DPGmME | 10.0% |
| MPD | 3.0% |
| Trimethylolpropane | 3.0% |
| Surfynol TG | 1.2% |
| Triethanolamine | 0.9% |
| Ion-exchanged water | Balance |
| Example B6 | |
| Water-soluble pigment 6 (100) | 5.0% |
| Direct Black 171 | 1.0% |
| PGmBE | 5.0% |
| DPGmBE | 2.0% |
| DEGmBE | 10.0% |
| Neopentyl glycol | 5.0% |
| Surfynol TG | 0.5% |
| Surfynol 104 | 0.5% |
| Ion-exchanged water | Balance |
| Example B7 | |
| Water-soluble pigment 7 (110) | 5.0% |
| Acid Black 24 | 1.0% |
| TEGmBE | 10.0% |
| Glycerin | 5.0% |
| Trimethylolpropane | 5.0% |
| Trimethylolethane | 5.0% |
| Surfynol 465 | 1.0% |
| Surfynol TG | 0.6% |
| Triethanolamine | 0.1% |
| Ion-exchanged water | Balance |
| Example B8 | |
| Water-soluble pigment 8 (90) | 5.5% |
| Acid Black 156 | 1.0% |
| DPGmBE | 5.0% |
| DEGmtBE | 5.0% |
| DEGmBE | 5.0% |
| Diethylene glycol | 5.0% |
| Tetrapropylene glycol | 5.0% |
| Surfynol 104 | 1.0% |
| Ion-exchanged water | Balance |

Thereafter, the following comparative ink compositions were prepared.

In the comparative ink compositions, a dispersion prepared by dispersing a carbon black having an average particle diameter of 90 to 110 μm with the aid of a styrene-acrylic dispersant was used as a pigment dispersion. Numerical values within the parentheses in the pigment dispersions are average particle diameters of the carbon blacks.

| | |
|---|---|
| Comparative Example B1 | |
| Pigment dispersion (90) | 5.0% |
| TEGmME | 10.0% |
| Ethylene glycol | 8.0% |
| Dispersant | 3.0% |
| DEGmME | 7.0% |
| Ion-exchanged water | Balance |
| Comparative Example B2 | |
| Pigment dispersion (100) | 5.5% |
| Glycerin | 10.0% |
| Diethylene glycol | 10.0% |
| Dispersant | 5.0% |
| Ion-exchanged water | Balance |
| Comparative Example B3 | |
| Pigment dispersion (110) | 5.5% |
| Diethylene glycol | 10.0% |
| Surfynol 465 | 1.0% |
| Ion-exchanged water | Balance |

Printing test

Prints obtained using the above ink compositions were evaluated in the same manner as in Example A. In this case, no reaction solution was used, and prints obtained using the ink compositions alone were evaluated.

The results were as shown in the following Table 3.

TABLE 3

| Test item | Type of paper | Ex. B 1 | 2 | 3 | 4 | 5 | 6 | 7 | 8 | Comp. Ex. B 1 | 2 | 3 |
|---|---|---|---|---|---|---|---|---|---|---|---|---|
| Bleeding | Conqueror Paper | ⊙ | ⊙ | ⊙ | ⊙ | ⊙ | ⊙ | ⊙ | ⊙ | ○ | ○ | ⊙ |
| | Favorit Paper | ⊙ | ⊙ | ⊙ | ⊙ | ⊙ | ⊙ | ⊙ | ⊙ | Δ | Δ | ○ |
| | Modo Copy Paper | ⊙ | ⊙ | ⊙ | ⊙ | ⊙ | ⊙ | ⊙ | ⊙ | X | X | Δ |
| | Rapid Copy Paper | ⊙ | ⊙ | ⊙ | ⊙ | ⊙ | ⊙ | ⊙ | ⊙ | Δ | Δ | ○ |
| | EPSON EPP Paper | ⊙ | ⊙ | ⊙ | ⊙ | ⊙ | ⊙ | ⊙ | ⊙ | X | X | Δ |
| | Xerox P Paper | ⊙ | ⊙ | ⊙ | ⊙ | ⊙ | ⊙ | ⊙ | ⊙ | X | X | Δ |
| | Xerox 4024 Paper | ⊙ | ⊙ | ⊙ | ⊙ | ⊙ | ⊙ | ⊙ | ⊙ | Δ | Δ | ○ |
| | Xerox 10 Paper | ⊙ | ⊙ | ⊙ | ⊙ | ⊙ | ⊙ | ⊙ | ⊙ | Δ | Δ | Δ |
| | Neenha Bond Paper | ⊙ | ⊙ | ⊙ | ⊙ | ⊙ | ⊙ | ⊙ | ⊙ | X | X | Δ |
| | Ricopy 6200 Paper | ⊙ | ⊙ | ⊙ | ⊙ | ⊙ | ⊙ | ⊙ | ⊙ | Δ | Δ | Δ |
| | Yamayuri Paper | ⊙ | ⊙ | ⊙ | ⊙ | ⊙ | ⊙ | ⊙ | ⊙ | X | X | X |
| | Xerox R Paper | ⊙ | ⊙ | ⊙ | ⊙ | ⊙ | ⊙ | ⊙ | ⊙ | X | X | X |
| Feathering | Congueror Paper | ⊙ | ⊙ | ⊙ | ⊙ | ⊙ | ⊙ | ⊙ | ⊙ | X | X | Δ |
| | Favorit Paper | ⊙ | ⊙ | ⊙ | ⊙ | ⊙ | ⊙ | ⊙ | ⊙ | Δ | Δ | Δ |
| | Modo Copy Paper | ⊙ | ⊙ | ⊙ | ⊙ | ⊙ | ⊙ | ⊙ | ⊙ | Δ | Δ | X |
| | Rapid Copy Paper | ⊙ | ⊙ | ⊙ | ⊙ | ⊙ | ⊙ | ⊙ | ⊙ | X | X | X |
| | Xerox P Paper | ⊙ | ⊙ | ⊙ | ⊙ | ⊙ | ⊙ | ⊙ | ⊙ | X | X | Δ |
| | Xerox 4024 Paper | ⊙ | ⊙ | ⊙ | ⊙ | ⊙ | ⊙ | ⊙ | ⊙ | X | X | X |
| | Yamayuri Paper | ⊙ | ⊙ | ⊙ | ⊙ | ⊙ | ⊙ | ⊙ | ⊙ | X | X | X |
| | Xerox R Paper | ⊙ | ⊙ | ⊙ | ⊙ | ⊙ | ⊙ | ⊙ | ⊙ | X | X | X |

The OD values of the prints using the above ink compositions were evaluated in the same manner as in Example A. In this case, no reaction solution was used, and prints obtained using the ink compositions alone were evaluated. The results were as shown in the following Table 4.

TABLE 4

| Ex. | B1 | B2 | B3 | B4 | B5 | B6 | B7 | B8 |
|---|---|---|---|---|---|---|---|---|
| Conqueror Paper | 1.35 | 1.34 | 1.36 | 1.38 | 1.35 | 1.36 | 1.37 | 1.39 |
| Favorit Paper | 1.37 | 1.36 | 1.39 | 1.41 | 1.36 | 1.37 | 1.38 | 1.40 |
| Modo Copy Paper | 1.34 | 1.34 | 1.36 | 1.36 | 1.34 | 1.33 | 1.34 | 1.38 |
| Rapid Copy Paper | 1.33 | 1.33 | 1.32 | 1.34 | 1.33 | 1.33 | 1.35 | 1.36 |
| Xerox P Paper | 1.32 | 1.31 | 1.32 | 1.33 | 1.32 | 1.33 | 1.34 | 1.34 |
| Xerox 4024 Paper | 1.30 | 1.30 | 1.31 | 1.32 | 1.31 | 1.30 | 1.32 | 1.32 |
| Yamayuri Paper | 1.40 | 1.39 | 1.40 | 1.41 | 1.37 | 1.35 | 1.39 | 1.42 |
| Xerox R Paper | 1.38 | 1.36 | 1.39 | 1.38 | 1.35 | 1.38 | 1.38 | 1.40 |

| Comp. Ex. | B1 | B2 | B3 |
|---|---|---|---|
| Conqueror Paper | 1.15 | 1.12 | 1.14 |
| Favorit Paper | 1.16 | 1.13 | 1.15 |
| Modo Copy Paper | 1.13 | 1.11 | 1.12 |
| Rapid Copy Paper | 1.14 | 1.12 | 1.13 |
| Xerox P Paper | 1.10 | 1.09 | 1.10 |
| Xerox 4024 Paper | 1.08 | 1.07 | 1.10 |
| Yamayuri Paper | 1.17 | 1.17 | 1.14 |
| Xerox R Paper | 1.16 | 1.15 | 1.12 |

In Examples B1 to B8, the addition of saccharides to the ink compositions resulted in an about 10 to 30% improvement in resumption of successful printing from clogging of the nozzle Example C In the following examples, a pigment dispersion was prepared by dispersing a carbon black having an average particle diameter of 10 to 300 nm and a degree of dispersion of not more than 10 with a surfactant and/or a water-soluble resin prepared by regulated polymerization. The carbon black had been subjected to surface treatment to bond carbonyl, carboxyl, hydroxyl and the like onto the surface thereof, permitting the pigment to be dispersed and/or dissolved in water without the aid of any dispersant. Numerical values within the parentheses in pigment dispersions 1 to 8 are the average particle diameters (nm) of the carbon blacks Water as the balance contained 0.1 to 1% of Proxel XL-2 as an agent for preventing the corrosion of the ink and 0.001 to 0.05% of benzotriazole as an agent for preventing the corrosion of an ink jet head member.

Example C1

| | |
|---|---|
| Pigment dispersion 1 (105) | 5.0% |
| Solsperse 20000 | 1.0% |
| PGmBE | 5.0% |
| DEGmBE | 7.0% |
| Glycerin | 6.0% |
| 1,4-Butanediol | 5.0% |
| Surfynol 104 | 1.0% |
| Triethanolamine | 0.8% |
| Ion-exchanged water | Balance |

Example C2

| | |
|---|---|
| Pigment dispersion 2 (85) | 4.5% |
| Solsperse 27000 | 1.0% |
| DPGmBE | 5.0% |
| TEGmBE | 10.0% |
| Dipropylene glycol | 5.0% |
| Urea | 5.0% |
| Surfynol TG | 1.2% |
| Fluorine surfactant | 0.1% |
| Ion-exchanged water | Balance |

Example C3

| | |
|---|---|
| Pigment dispersion 3 (20) | 5.5% |
| Solsperse 20000 | 0.5% |
| Solsperse 27000 | 0.5% |
| PGmBE | 5.0% |
| DEGmBE | 10.0% |
| Propylene glycol | 7.0% |
| Triethylene glycol | 3.0% |
| 1,5-Pentanediol | 5.0% |
| Surfynol TG | 1.4% |
| Potassium hydroxide | 0.1% |
| Ion-exchanged water | Balance |

Example C4

| | |
|---|---|
| Pigment dispersion 4 (80) | 5.0% |
| Regulated polymerization type acrylic resin | 1.0% |
| DEGmBE | 10.0% |
| 1,6-Hexanediol | 5.0% |
| Tripropylene glycol | 2.0% |
| DMI | 2.0% |
| Surfynol 104 | 0.8% |
| Surfynol 465 | 0.4% |
| Sodium benzoate | 0.1% |
| Ion-exchanged water | Balance |

Example C5

| | |
|---|---|
| Pigment dispersion 5 (95) | 5.0% |
| Regulated polymerization type styrene/acrylic resin | 1.0% |
| PGmBE | 5.0% |
| DPGmME | 10.0% |
| MPD | 3.0% |
| Trimethylolpropane | 3.0% |
| Surfynol TG | 1.2% |
| Triethanolamine | 0.9% |
| Ion-exchanged water | Balance |

Example C6

| | |
|---|---|
| Pigment dispersion 6 (100) | 5.0% |
| Solsperse 20000 | 1.0% |
| Regulated polymerization type styrene/acrylic resin | 1.0% |
| PGmBE | 5.0% |
| DPGmBE | 2.0% |
| DEGmBE | 10.0% |
| Neopentyl glycol | 5.0% |
| Surfynol TG | 0.5% |
| Surfynol 104 | 0.5% |
| Ion-exchanged water | Balance |

Example C7

| | |
|---|---|
| Pigment dispersion 7 (150) | 5.0% |
| Regulated polymerization type acrylic resin | 1.0% |
| Regulated polymerization type styrene/acrylic resin | 1.0% |
| TEGmBE | 10.0% |
| Glycerin | 5.0% |
| Trimethylolpropane | 5.0% |
| Trimethylolethane | 5.0% |
| Surfynol 465 | 1.0% |
| Surfynol TG | 0.6% |
| Triethanolamine | 0.1% |
| Ion-exchanged water | Balance |

-continued

Example C8

| | |
|---|---|
| Pigment dispersion 8 (200) | 5.5% |
| Solsperse 27000 | 0.5% |
| Regulated polymerization type acrylic resin | 1.0% |
| DPGmBE | 5.0% |
| DEGmtBE | 5.0% |
| DEGmBE | 5.0% |
| Diethylene glycol | 5.0% |
| Tetrapropylene glycol | 5.0% |
| Surfynol 104 | 1.0% |
| Ion-exchanged water | Balance |

The following comparative ink compositions were prepared.

-continued

Comparative Example C3

| | |
|---|---|
| Pigment dispersion 11 (110) | 5.5% |
| Diethylene glycol | 10.0% |
| Surfynol 465 | 1.0% |
| Ion-exchanged water | Balance |

Printing test

Prints obtained using the above ink compositions were evaluated in the same manner as in Example A. In this case, no reaction solution was used, and prints obtained using the ink compositions alone were evaluated.

The results were as shown in the following Table 5.

TABLE 5

| Test item | Type of paper | Ex. C | | | | | | | | Comp. Ex. C | | |
|---|---|---|---|---|---|---|---|---|---|---|---|---|
| | | 1 | 2 | 3 | 4 | 5 | 6 | 7 | 8 | 1 | 2 | 3 |
| Bleeding | Conqueror Paper | ⊚ | ⊚ | ⊚ | ⊚ | ⊚ | ⊚ | ⊚ | ⊚ | ○ | ○ | ⊚ |
| | Favorit Paper | ⊚ | ⊚ | ⊚ | ⊚ | ⊚ | ⊚ | ⊚ | ⊚ | Δ | Δ | ○ |
| | MOdo Copy Paper | ⊚ | ⊚ | ⊚ | ⊚ | ⊚ | ⊚ | ⊚ | ⊚ | X | X | Δ |
| | Rapid Copy Paper | ⊚ | ⊚ | ⊚ | ⊚ | ⊚ | ⊚ | ⊚ | ⊚ | Δ | Δ | ○ |
| | EPSON EPP Paper | ⊚ | ⊚ | ⊚ | ⊚ | ⊚ | ⊚ | ⊚ | ⊚ | X | X | Δ |
| | Xerox P Paper | ⊚ | ⊚ | ⊚ | ⊚ | ⊚ | ⊚ | ⊚ | ⊚ | X | X | Δ |
| | Xerox 4024 Paper | ⊚ | ⊚ | ⊚ | ⊚ | ⊚ | ⊚ | ⊚ | ⊚ | Δ | Δ | ○ |
| | Xerox 10 Paper | ⊚ | ⊚ | ⊚ | ⊚ | ⊚ | ⊚ | ⊚ | ⊚ | Δ | Δ | Δ |
| | Neenha Bond Paper | ⊚ | ⊚ | ⊚ | ⊚ | ⊚ | ⊚ | ⊚ | ⊚ | X | X | Δ |
| | Ricopy 6200 Paper | ⊚ | ⊚ | ⊚ | ⊚ | ⊚ | ⊚ | ⊚ | ⊚ | Δ | Δ | Δ |
| | Yamayuri Paper | ⊚ | ⊚ | ⊚ | ⊚ | ⊚ | ⊚ | ⊚ | ⊚ | X | X | X |
| | Xerox R Paper | ⊚ | ⊚ | ⊚ | ⊚ | ⊚ | ⊚ | ⊚ | ⊚ | X | X | X |
| Feathering | Conqueror Paper | ⊚ | ⊚ | ⊚ | ⊚ | ⊚ | ⊚ | ⊚ | ⊚ | X | X | Δ |
| | Favorit Paper | ⊚ | ⊚ | ⊚ | ⊚ | ⊚ | ⊚ | ⊚ | ⊚ | Δ | Δ | Δ |
| | Modo Copy Paper | ⊚ | ⊚ | ⊚ | ⊚ | ⊚ | ⊚ | ⊚ | ⊚ | Δ | Δ | X |
| | Rapid Copy Paper | ⊚ | ⊚ | ⊚ | ⊚ | ⊚ | ⊚ | ⊚ | ⊚ | X | X | X |
| | Xerox P Paper | ⊚ | ⊚ | ⊚ | ⊚ | ⊚ | ⊚ | ⊚ | ⊚ | X | X | Δ |
| | Xerox 4024 Paper | ⊚ | ⊚ | ⊚ | ⊚ | ⊚ | ⊚ | ⊚ | ⊚ | X | X | X |
| | Yamayuri Paper | ⊚ | ⊚ | ⊚ | ⊚ | ⊚ | ⊚ | ⊚ | ⊚ | X | X | X |
| | Xerox R Paper | ⊚ | ⊚ | ⊚ | ⊚ | ⊚ | ⊚ | ⊚ | ⊚ | X | X | X |

In the comparative ink compositions, a dispersion prepared by dispersing a carbon black having an average particle diameter of 90 to 110 μm with the aid of a styrene-acrylic dispersant was used as a pigment dispersion. Numerical values within the parentheses in the pigment dispersions are average particle diameters of the carbon blacks.

Comparative Example C1

| | |
|---|---|
| Pigment dispersion 9 (90) | 5.0% |
| TEGmME | 10.0% |
| Ethylene glycol | 8.0% |
| Dispersant | 3.0% |
| DEGmME | 7.0% |
| Ion-exchanged water | Balance |

Comparative Example C2

| | |
|---|---|
| Pigment dispersion 10 (100) | 5.5% |
| Glycerin | 10.0% |
| Diethylene glycol | 10.0% |
| Dispersant | 5.0% |
| Ion-exchanged water | Balance |

Example D

In the following examples, a pigment dispersion was prepared by dispersing a carbon black having an average particle diameter of 10 to 300 nm and a degree of dispersion of not more than 10 in a surfactant and/or a water-soluble resin prepared by regulated polymerization. The carbon black had been subjected to surface treatment to bond carbonyl, carboxyl, hydroxyl and the like onto the surface thereof, permitting the pigment to be dispersed and/or dissolved in water without the aid of any dispersant. Numerical values within the parentheses in pigment dispersions 1 to 8 are the average particle diameters (nm) of the carbon blacks Water as the balance contained 0.1 to 1% of Proxel XL-2 as an agent for preventing the corrosion of the ink and 0.001 to 0.05% of benzotriazole as an agent for preventing the corrosion of an ink jet head member.

In the following examples, Dyes (1) to (23) correspond to dye numbers described above.

| Example D1 | |
|---|---|
| Pigment dispersion 1 (105) | 5.0% |
| Mixture of Dye (1) to (23) | 3.0% |
| Solsperse 20000 | 1.0% |
| PGmBE | 5.0% |
| DEGmBE | 7.0% |
| Glycerin | 6.0% |
| 1,4-Butanediol | 5.0% |
| Surfynol 104 | 1.0% |
| Triethanolamine | 0.8% |
| Ion-exchanged water | Balance |

| Example D2 | |
|---|---|
| Pigment dispersion 2 (85) | 4.5% |
| Dye (2) | 2.5% |
| Solsperse 27000 | 1.0% |
| DPGmBE | 5.0% |
| TEGmBE | 10.0% |
| Dipropylene glycol | 5.0% |
| Urea | 5.0% |
| Surfynol TG | 1.2% |
| Fluorosurfactant | 0.1% |
| Ion-exchanged water | Balance |

| Example D3 | |
|---|---|
| Pigment dispersion 3 (20) | 5.5% |
| Mixture of Dye (1) to (5) | 3.0% |
| Solsperse 20000 | 0.5% |
| Solsperse 27000 | 0.5% |
| PGmBE | 5.0% |
| DEGmBE | 10.0% |
| Propylene glycol | 7.0% |
| Triethylene glycol | 3.0% |
| 1,5-Pentanediol | 5.0% |
| Surfynol TG | 1.4% |
| Potassium hydroxide | 0.1% |
| Ion-exchanged water | Balance |

| Example D4 | |
|---|---|
| Pigment dispersion 4 (80) | 5.0% |
| Dye (6) | 2.0% |
| Dye (7) | 2.0% |
| Regulated polymerization type acrylic resin | 1.0% |
| DEGmBE | 10.0% |
| 1,6-Hexanediol | 5.0% |
| Tripropylene glycol | 2.0% |
| DMI | 2.0% |
| Surfynol 104 | 0.8% |
| Surfynol 465 | 0.4% |
| Sodium benzoate | 0.1% |
| Ion-exchanged water | Balance |

| Example D5 | |
|---|---|
| Pigment dispersion 5 (95) | 3.0% |
| Dye (1) | 6.0% |
| Regulated polymerization type styrene/acrylic resin | 1.0% |
| PGmBE | 5.0% |
| DPGmME | 10.0% |
| MPD | 3.0% |
| Trimethylolpropane | 3.0% |
| Surfynol TG | 1.2% |
| Triethanolamine | 0.9% |
| Ion-exchanged water | Balance |

| Example D6 | |
|---|---|
| Pigment dispersion 6 (100) | 5.0% |
| Dye (3) | 3.5% |
| Solsperse 20000 | 1.0% |
| Regulated polymerization type styrene/acrylic resin | 1.0% |
| PGmBE | 5.0% |
| DPGmBE | 2.0% |
| DEGmBE | 10.0% |
| Neopentyl glycol | 5.0% |
| Surfynol TG | 0.5% |
| Surfynol 104 | 0.5% |
| Ion-exchanged water | Balance |

| Example D7 | |
|---|---|
| Pigment dispersion 7 (150) | 5.0% |
| Mixture of Dye (4) to (8) | 4.0% |
| Regulated polymerization type acrylic resin | 1.0% |
| Regulated polymerization type styrene/acrylic resin | 1.0% |
| TEGmBE | 10.0% |
| Glycerin | 5.0% |
| Trimethylolpropane | 5.0% |
| Trimethylolethane | 5.0% |
| Surfynol 465 | 1.0% |
| Surfynol TG | 0.6% |
| Triethanolamine | 0.1% |
| Ion-exchanged water | Balance |

| Example D8 | |
|---|---|
| Pigment dispersion 8 (200) | 5.5% |
| Dye (3) | 1.0% |
| Dye (5) | 2.5% |
| Solsperse 27000 | 0.5% |
| Regulated polymerization type acrylic resin | 1.0% |
| DPGmBE | 5.0% |
| DEGmtBE | 5.0% |
| DEGmBE | 5.0% |
| Diethylene glycol | 5.0% |
| Tetrapropylene glycol | 5.0% |
| Surfynol 104 | 1.0% |
| Ion-exchanged water | Balance |

The following comparative ink compositions were prepared.

In the comparative ink compositions, a dispersion prepared by dispersing a carbon black having an average particle diameter of 90 to 110 µm with the aid of a styrene-acrylic dispersant was used as a pigment dispersion. Numerical values within the parentheses in the pigment dispersions are average particle diameters of the carbon blacks.

| Comparative Example D1 | |
|---|---|
| Pigment dispersion (90) | 5.0% |
| TEGmME | 10.0% |
| Ethylene glycol | 8.0% |
| Dispersant | 3.0% |
| DEGmME | 7.0% |
| Ion-exchanged water | Balance |

| Comparative Example D2 | |
|---|---|
| Water-soluble dye (Food Black 2) | 5.5% |
| Glycerin | 10.0% |
| Diethylene glycol | 10.0% |
| 2-Pyrrolidone | 5.0% |
| Ion-exchanged water | Balance |

| Comparative Example D3 | |
|---|---|
| Pigment dispersion (110) | 5.5% |
| Water-soluble dye (Food Black 2) | 2.5% |
| Diethylene glycol | 10.0% |
| Surfynol 465 | 1.0% |
| Ion-exchanged water | Balance |

Printing test

Prints obtained using the above ink compositions were evaluated in the same manner as in Example A. In this case, no reaction solution was used, and prints obtained using the ink compositions alone were evaluated.

The results were as shown in the following Table 6.

TABLE 6

| Test | | Ex. D | | | | | | | | Comp. Ex. D | | |
|---|---|---|---|---|---|---|---|---|---|---|---|---|
| item | Type of paper | 1 | 2 | 3 | 4 | 5 | 6 | 7 | 8 | 1 | 2 | 3 |
| Bleed-ing | Conqueror Paper | ⊚ | ⊚ | ⊚ | ⊚ | ⊚ | ⊚ | ⊚ | ⊚ | ○ | ○ | ⊚ |
| | Favorit Paper | ⊚ | ⊚ | ⊚ | ⊚ | ⊚ | ⊚ | ⊚ | ⊚ | Δ | Δ | ○ |
| | Modo Copy Paper | ⊚ | ⊚ | ⊚ | ⊚ | ⊚ | ⊚ | ⊚ | ⊚ | X | X | Δ |
| | Rapid Copy Paper | ⊚ | ⊚ | ⊚ | ⊚ | ⊚ | ⊚ | ⊚ | ⊚ | Δ | Δ | ○ |
| | EPSON EPP Paper | ⊚ | ⊚ | ⊚ | ⊚ | ⊚ | ⊚ | ⊚ | ⊚ | X | X | Δ |
| | Xerox P Paper | ⊚ | ⊚ | ⊚ | ⊚ | ⊚ | ⊚ | ⊚ | ⊚ | X | X | Δ |
| | Xerox 4024 Paper | ⊚ | ⊚ | ⊚ | ⊚ | ⊚ | ⊚ | ⊚ | ⊚ | Δ | Δ | ○ |
| | Xerox 10 Paper | ⊚ | ⊚ | ⊚ | ⊚ | ⊚ | ⊚ | ⊚ | ⊚ | Δ | Δ | Δ |
| | Neenha Bond Paper | ⊚ | ⊚ | ⊚ | ⊚ | ⊚ | ⊚ | ⊚ | ⊚ | X | X | Δ |
| | Ricopy 6200 Paper | ⊚ | ⊚ | ⊚ | ⊚ | ⊚ | ⊚ | ⊚ | ⊚ | Δ | Δ | Δ |
| | Yamayuri Paper | ⊚ | ⊚ | ⊚ | ⊚ | ⊚ | ⊚ | ⊚ | ⊚ | X | X | X |
| | Xerox R Paper | ⊚ | ⊚ | ⊚ | ⊚ | ⊚ | ⊚ | ⊚ | ⊚ | X | X | X |
| Feath-ering | Conqueror Paper | ⊚ | ⊚ | ⊚ | ⊚ | ⊚ | ⊚ | ⊚ | ⊚ | X | X | Δ |
| | Favorit Paper | ⊚ | ⊚ | ⊚ | ⊚ | ⊚ | ⊚ | ⊚ | ⊚ | Δ | Δ | Δ |
| | Modo Copy Paper | ⊚ | ⊚ | ⊚ | ⊚ | ⊚ | ⊚ | ⊚ | ⊚ | Δ | Δ | X |
| | Rapid Copy Paper | ⊚ | ⊚ | ⊚ | ⊚ | ⊚ | ⊚ | ⊚ | ⊚ | X | X | X |
| | Xerox P Paper | ⊚ | ⊚ | ⊚ | ⊚ | ⊚ | ⊚ | ⊚ | ⊚ | X | X | Δ |
| | Xerox 4024 Paper | ⊚ | ⊚ | ⊚ | ⊚ | ⊚ | ⊚ | ⊚ | ⊚ | X | X | X |
| | Yamayuri Paper | ⊚ | ⊚ | ⊚ | ⊚ | ⊚ | ⊚ | ⊚ | ⊚ | X | X | X |
| | Xerox R Paper | ⊚ | ⊚ | ⊚ | ⊚ | ⊚ | ⊚ | ⊚ | ⊚ | X | X | X |

In Example D1, the pigment and dye contents were varied as follows. Printing was performed using the ink compositions in the same manner as described above, and the OD value of the prints was measured. The results were as summarized in the following Table 7.

TABLE 7

| Amount (wt %) | | |
|---|---|---|
| Pigment | Dye | OD |
| 8.0 | 0.0 | 1.27 |
| 7.0 | 1.0 | 1.30 |
| 6.0 | 2.0 | 1.36 |
| 5.0 | 3.0 | 1.40 |
| 4.0 | 4.0 | 1.42 |
| 3.0 | 5.0 | 1.34 |
| 2.0 | 6.0 | 1.29 |
| 1.0 | 7.0 | 1.26 |
| 0.0 | 8.0 | 1.24 |

Example E

In the following examples, water-soluble pigments are carbon blacks dispersed by surface treatment. Water-soluble pigments 1 to 4 are Microjet CW2 manufactured by Orient Chemical Industries, Ltd., and water-soluble pigments 5 to 8 are CW1 manufactured by Orient Chemical Industries, Ltd. These pigments are those prepared by oxidizing the surface of a carbon black having a particle diameter of 10 to 300 nm and a degree of dispersion of not more than 10 to form a carbonyl group, a carboxyl group, a hydroxyl group, a sulfonyl group or the like on the surface thereof. Numerical values within the parentheses in pigment dispersions 1 to 8 are the average particle diameters (nm) of the carbon blacks Water as the balance contained 0.1 to 1% of Proxel XL-2 as an agent for preventing the corrosion of the ink and 0.001 to 0.05% of benzotriazole as an agent for preventing an ink jet head member.

The following black ink compositions were prepared.

| Example E11 | |
|---|---|
| Water-soluble pigment 1 (105) | 5.0% |
| PGmBE | 5.0% |
| DEGmBE | 7.0% |
| Glycerin | 6.0% |
| 1,5-pentanediol | 5.0% |
| Surfynol 104 | 1.0% |
| Triethanolamine | 0.8% |
| Ion-exchanged water | Balance |
| Example E12 | |
| Water-soluble pigment 2 (85) | 4.5% |
| DPGmBE | 5.0% |
| TEGmBE | 10.0% |
| Dipropylene glycol | 5.0% |
| Urea | 5.0% |
| Surfynol TG | 1.2% |
| Fluorine surfactant | 0.1% |
| Ion-exchanged water | Balance |
| Example E13 | |
| Water-soluble pigment 3 (90) | 5.5% |
| PGmBE | 5.0% |
| DEGmBE | 10.0% |
| Propylene glycol | 7.0% |
| Triethylene glycol | 3.0% |
| 1,6-Hexanediol | 5.0% |
| Surfynol TG | 1.4% |
| Potassium hydroxide | 0.1% |
| Ion-exchanged water | Balance |
| Example E14 | |
| Water-soluble pigment 4 (80) | 5.0% |
| DEGmBE | 10.0% |
| 1,6-Hexanediol | 5.0% |
| Tripropylene glycol | 2.0% |
| DMI | 2.0% |
| Surfynol 104 | 0.8% |
| Surfynol 465 | 0.4% |
| Sodium benzoate | 0.1% |
| Ion-exchanged water | Balance |
| Example E15 | |
| Water-soluble pigment 5 (95) | 3.0% |
| PGmBE | 5.0% |
| DPGmME | 10.0% |
| MPD | 3.0% |

|  |  |
|---|---|
| Trimethylolpropane | 3.0% |
| Surfynol TG | 1.2% |
| Triethanolamine | 0.9% |
| Ion-exchanged water | Balance |
| Example E16 | |
| Water soluble pigment 6 (100) | 5.0% |
| PGmBE | 5.0% |
| DPGmBE | 2.0% |
| DEGmBE | 10.0% |
| Neopentyl glycol | 5.0% |
| Surfynol TG | 0.5% |
| Surfynol 104 | 0.5% |
| Ion-exchanged water | Balance |
| Example E17 | |
| Water-soluble pigment 7 (150) | 5.0% |
| TEGmBE | 10.0% |
| Glycerin | 5.0% |
| Trimethylolpropane | 5.0% |
| Trimethylolethane | 5.0% |
| Surfynol 465 | 1.0% |
| Surfynol TG | 0.6% |
| Triethanolamine | 0.1% |
| Ion-exchanged water | Balance |
| Example E18 | |
| Water-soluble pigment 8 (200) | 5.5% |
| DPGmBE | 5.0% |
| DEGmtBE | 5.0% |
| DEGmBE | 5.0% |
| Diethylene glycol | 5.0% |
| Tetrapropylene glycol | 5.0% |
| Surfynol 104 | 1.0% |
| Ion-exchanged water | Balance |

The following color ink compositions were prepared.

|  |  |
|---|---|
| Example E21 | |
| Direct Blue 23 | 5.0% |
| Magnesium nitrate | 1.0% |
| PGmBE | 5.0% |
| DEGmBE | 7.0% |
| Glycerin | 6.0% |
| 1,5-pentanediol | 5.0% |
| Surfynol 104 | 1.0% |
| Triethanolamine | 0.8% |
| Ion-exchanged water | Balance |
| Example E22 | |
| Direct Red 283 | 4.5% |
| Calcium oxalate | 1.5% |
| DPGmBE | 5.0% |
| TEGmBE | 10.0% |
| Dipropylene glycol | 5.0% |
| Urea | 5.0% |
| Surfynol TG | 1.2% |
| Fluorine surfactant | 0.1% |
| Ion-exchanged water | Balance |
| Example E23 | |
| Direct Yellow 86 | 5.5% |
| Calcium carbonate | 1.0% |
| PGmBE | 5.0% |
| DEGmBE | 10.0% |
| Propylene glycol | 7.0% |
| Triethylene glycol | 3.0% |
| 1,6-Hexanediol | 5.0% |
| Surfynol TG | 1.4% |
| Potassium hydroxide | 0.1% |
| Ion-exchanged water | Balance |
| Example E24 | |
| Acid Blue 9 | 5.0% |
| Magnesium succinate | 1.0% |
| DEGmBE | 10.0% |

|  |  |
|---|---|
| 1,6-Hexanediol | 5.0% |
| Tripropylene glycol | 2.0% |
| DMI | 2.0% |
| Surfynol 104 | 0.8% |
| Surfynol 465 | 0.4% |
| Sodium benzoate | 0.1% |
| Ion-exchanged water | Balance |
| Example E25 | |
| Acid Red 283 | 3.0% |
| Magnesium ascorbate | 1.5% |
| PGmBE | 5.0% |
| DPGmME | 10.0% |
| MPD | 3.0% |
| Trimethylolpropane | 3.0% |
| Surfynol TG | 1.2% |
| Triethanolamine | 0.9% |
| Ion-exchanged water | Balance |
| Example E26 | |
| Acid Yellow 23 | 5.0% |
| Calcium glutarate | 1.0% |
| PGmBE | 5.0% |
| DPGmBE | 2.0% |
| DEGmBE | 10.0% |
| Neopentyl glycol | 5.0% |
| Surfynol TG | 0.5% |
| Surfynol 104 | 0.5% |
| Ion-exchanged water | Balance |
| Example E27 | |
| Direct Blue 86 | 5.0% |
| Calcium glutamate | 1.0% |
| TEGmBE | 10.0% |
| Glycerin | 5.0% |
| Trimethylolpropane | 5.0% |
| Trimethylolethane | 5.0% |
| Surfynol 465 | 1.0% |
| Surfynol TG | 0.6% |
| Triethanolamine | 0.1% |
| Ion-exchanged water | Balance |
| Example E28 | |
| Acid Red 35 | 5.5% |
| Magnesium lactate | 1.0% |
| DPGmBE | 5.0% |
| DEGmtBE | 5.0% |
| DEGmBE | 5.0% |
| Diethylene glycol | 5.0% |
| Tetrapropylene glycol | 5.0% |
| Surfynol 104 | 1.0% |
| Ion-exchanged water | Balance |

In the comparative ink compositions, a dispersion prepared by dispersing a carbon black having an average particle diameter of 90 to 110 μm with the aid of a styrene-acrylic acid dispersant was used as a pigment dispersion. Numerical values within the parentheses in the pigment dispersions are average particle diameters of the carbon blacks.

|  |  |
|---|---|
| Comparative Example E31 | |
| Pigment dispersion (90) | 5.0% |
| TEGmME | 10.0% |
| Ethylene glycol | 8.0% |
| Dispersant | 3.0% |
| DEGmME | 7.0% |
| Ion-exchanged water | Balance |
| Comparative Example E32 | |
| Pigment dispersion (110) | 5.5% |
| Water-soluble dye | 2.2% |
| (Food Black 2) | |
| Dispersant | 1.0% |
| Diethylene glycol | 10.0% |

| | |
|---|---|
| Surfynol 465 | 1.0% |
| Ion-exchanged water | Balance |
| Comparative Example E33 | |
| Water-soluble dye (Food Black 2) | 5.5% |
| Glycerin | 10.0% |
| Diethylene glycol | 10.0% |
| 2-Pyrrolidone | 5.0% |
| Ion-exchanged water | Balance |

Printing test

The above black inks and color inks were used to form a black ink dot and a color ink dot adjacent to each other, and the print was inspected for the presence of color-to-color intermixing, that is, bleeding. A printer with a modified material used in the head section of an ink jet printer MJ-900C manufactured by Seiko Epson Corporation was used for the printing. Recording papers listed in Table 8 were used as the recording medium.

The bleeding was visually inspected to evaluate the influence thereof on the formed image. Evaluation criteria are as follows.

◎ (excellent): Not influenced the image.

○ (good): Influenced the image but poses no problem in practical use of the ink composition.

Δ: Influenced the image and pose problem in practical use of the ink composition.

x: Influenced the image, rendering the ink composition unsuitable for practical use.

The results were as tabulated in Table 8.

TABLE 8

| Black ink | E11 | E12 | E13 | E14 | E15 | E16 | E17 | E18 | E33 | E32 | E33 |
|---|---|---|---|---|---|---|---|---|---|---|---|
| Color ink | E12 | E22 | E23 | E24 | E25 | E26 | E27 | E28 | E21 | E22 | E23 |
| Conqueror Paper | ◎ | ◎ | ◎ | ◎ | ◎ | ◎ | ◎ | ◎ | X | X | X |
| Favorit Paper | ◎ | ◎ | ◎ | ◎ | ◎ | ◎ | ◎ | ◎ | X | X | X |
| Modo Copy Paper | ◎ | ◎ | ◎ | ◎ | ◎ | ◎ | ◎ | ◎ | X | X | X |
| Rapid Copy Paper | ◎ | ◎ | ◎ | ◎ | ◎ | ◎ | ◎ | ◎ | X | X | X |
| EPSON EPP Paper | ◎ | ◎ | ◎ | ◎ | ◎ | ◎ | ◎ | ◎ | X | X | X |
| Xerox P Paper | ◎ | ◎ | ◎ | ◎ | ◎ | ◎ | ◎ | ◎ | X | X | X |
| Xerox 4024 Paper | ◎ | ◎ | ◎ | ◎ | ◎ | ◎ | ◎ | ◎ | X | X | X |
| Xerox 10 Paper | ◎ | ◎ | ◎ | ◎ | ◎ | ◎ | ◎ | ◎ | X | X | X |
| Neenha Bond Paper | ◎ | ◎ | ◎ | ◎ | ◎ | ◎ | ◎ | ◎ | X | X | X |
| Ricopy 6200 Paper | ◎ | ◎ | ◎ | ◎ | ◎ | ◎ | ◎ | ◎ | X | X | X |
| Yamayuri Paper | ◎ | ◎ | ◎ | ◎ | ◎ | ◎ | ◎ | ◎ | X | X | X |
| Xerox R Paper | ◎ | ◎ | ◎ | ◎ | ◎ | ◎ | ◎ | ◎ | X | X | X |

Then, color ink compositions of Examples E41 to E48 were prepared in the same manner as in Examples E21 to E28, except that magnesium sulfate, calcium oxalate, calcium carbonate, magnesium succinate, magnesium ascorbate, calcium glutarate, calcium glutamate, and calcium lactate used in respectively in Examples E21 to E28 were not added.

A reaction solution was prepared in the same manner as in Example E11, except that polyallylamine was added instead of the water-soluble pigment.

Printing was performed using the above ink compositions and the reaction solution. Prior to printing using the ink compositions, the reaction solution was coated by means of MJ-900C manufactured by Seiko Epson Corporation. Thereafter, a black dot and a color dot were formed in the same manner as described above, and the print was inspected for the presence of color-to-color intermixing, that is, bleeding. The results were evaluated in the same manner as described above. Xerox 4024 paper was used as the recording paper.

The results were as summarized in Table 9.

TABLE 9

| Black ink | E11 | E12 | E13 | E14 | E15 | E16 | E17 | E18 |
|---|---|---|---|---|---|---|---|---|
| Color ink | E41 | E42 | E43 | E44 | E45 | E46 | E47 | E48 |
| Xerox 4024 | ◎ | ◎ | ○ | ◎ | ◎ | ○ | ◎ | ○ |

What is claimed is:

1. An ink composition comprising a pigment, a glycol ether, and water, the pigment being dispersible and/or soluble in water without the aid of any dispersant, the glycol ether being one member or a mixture of two or more members selected from the group consisting of diethylene glycol mono-n-butyl ether, triethylene glycol mono-n-butyl ether, propylene glycol mono-n-butyl ether, and dipropylene glycol mono-n-butyl ether.

2. The ink composition according to claim 1, wherein the pigment has been treated to bond at least one functional group selected from the group consisting of carbonyl, carboxyl, hydroxyl, and sulfonyl groups or a salt thereof onto the surface thereof, permitting the pigment to be dispersed and/or dissolved in water without the aid of any dispersant.

3. The ink composition according to claim 1, wherein the pigment is present in the range of 2 to 15% by weight.

4. The ink composition according to claim 1, wherein the glycol ether is present in the range of 3 to 30% by weight.

5. The ink composition according to claim 1, which further comprises an acetylene glycol surfactant.

6. The ink composition according to claim 5, wherein the acetylene glycol surfactant is present in the range of 0.1 to 5% by weight.

7. The ink composition according to claim 1, which further comprises a glycol.

8. The ink composition according to claim 7, wherein the glycol is present in the range of 3 to 25% by weight.

9. The ink composition according to claim 1, which further comprises a dye.

10. The ink composition according to claim 9, wherein the dye is a water-soluble dye represented by the following general formula (I) or (II):

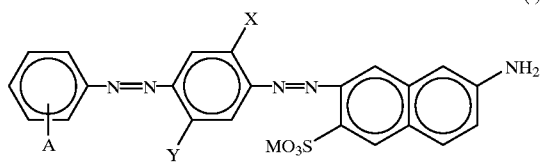

wherein A represents POOM or COOM, X and Y each independently represent an alkoxy or alkyl group, M represents an alkali metal, H, or $NH_4$ or an organic amine; and

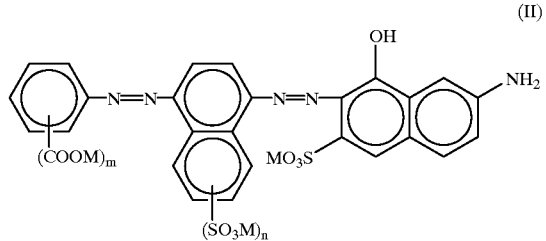

wherein M represents an alkali metal, H, or $NH_4$ or an organic amine, m is 1 or 2 and n is 0 or 1.

11. The ink composition according to claim 10, wherein the amount of the water-soluble dye added is 50 to less than 200% by weight based on the pigment.

12. The ink composition according to claim 1, which further comprises a surfactant and/or a regulated polymerization water-soluble resin.

13. The ink composition according to claim 12, wherein the surfactant and/or the regulated polymerization water-soluble resin can promote or stabilize the dispersion of the pigment.

14. The ink composition according to claim 1, wherein the pigment is a carbon black having an average particle diameter of 60–150 μm.

15. An ink composition as claimed in claim 1, wherein the water is the major component in the ink composition.

16. An ink composition as claimed in claim 15, wherein the water is present in the ink composition in an amount of at least about 59% by weight.

17. An ink composition as claimed in claim 1, wherein the water is present in the ink composition in an amount of between about 59–74% by weight.

18. An ink composition as claimed in claim 15, wherein the glycol ether is present in an amount of about 3–30% by weight.

19. An ink composition as claimed in claim 18 wherein the pigment is present in the ink composition in an amount of about 2–15% by weight.

* * * * *